US010059788B2

(12) United States Patent
Holtcamp et al.

(10) Patent No.: US 10,059,788 B2
(45) Date of Patent: Aug. 28, 2018

(54) ORGANOALUMINUM ACTIVATORS ON CLAYS

(71) Applicant: ExxonMobil Chemical Patents Inc., Baytown, TX (US)

(72) Inventors: Matthew W. Holtcamp, Huffman, TX (US); Gregory S. Day, College Station, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/464,020

(22) Filed: Mar. 20, 2017

(65) Prior Publication Data

US 2017/0313799 A1 Nov. 2, 2017

Related U.S. Application Data

(60) Provisional application No. 62/329,453, filed on Apr. 29, 2016.

(51) Int. Cl.
*C08F 210/16* (2006.01)

(52) U.S. Cl.
CPC .................................. *C08F 210/16* (2013.01)

(58) Field of Classification Search
None
See application file for complete search history.

(56) References Cited

U.S. PATENT DOCUMENTS 3,624,057 A 11/1971 Farrar
4,874,734 A 10/1989 Kioka et al.
5,122,491 A 6/1992 Kioka et al.
5,155,078 A 10/1992 Kioka et al.
5,234,878 A 8/1993 Tsutsui et al.
5,308,811 A 5/1994 Suga et al.
5,654,248 A 8/1997 Kioka et al.
5,928,982 A 7/1999 Suga et al.
5,973,084 A 10/1999 Suga et al.
6,040,261 A 3/2000 Hlatky
6,048,817 A 4/2000 Sagae et al.
6,147,173 A 11/2000 Holtcamp
6,211,105 B1 4/2001 Holtcamp
6,239,062 B1 5/2001 Cribbs
6,353,063 B1 3/2002 Shimizu et al.
6,376,416 B1 4/2002 Hirakawa et al.
6,376,629 B2 4/2002 Nagy et al.
6,414,162 B1 7/2002 Nagy
6,451,724 B1 9/2002 Nifant'ev et al.
6,489,480 B2 12/2002 Rodriguez
6,531,552 B2 3/2003 Nakano et al.
2002/0038036 A1 3/2002 Resconi et al.
2003/0027950 A1 2/2003 Uchino et al.
2003/0104928 A1 6/2003 Holtcamp
2005/0148743 A1 7/2005 Casty et al.
2005/0245701 A1 11/2005 Oshima et al.
2005/0267273 A1 12/2005 Kashiwa et al.
2006/0155083 A1 7/2006 Nakayama et al.
2007/0185343 A1 8/2007 Verpoort et al.
2011/0092651 A1 4/2011 Arriola et al.
2013/0289227 A1 10/2013 Jensen et al.
2015/0119540 A1 4/2015 Holtcamp et al.

FOREIGN PATENT DOCUMENTS

EP 0511665 11/1992
EP 1160261 12/2001
GB 887313 1/1962
JP S62100506 5/1987
JP H0525214 2/1993
JP 11166011 6/1999
JP 11166012 6/1999
JP 11255816 9/1999
JP 2000072813 3/2000
JP 2000198812 7/2000
JP 2001026613 1/2001
JP 2001031720 2/2001
JP 2001-163908 6/2001
JP 2001163909 6/2001
JP 2001200010 7/2001
JP 2001316414 11/2001
JP 2001316415 11/2001
JP 2002020415 1/2002
JP 200237812 2/2002
JP 200260411 2/2002
JP 20269116 3/2002
JP 2002253486 9/2002
JP 2004083773 3/2004
WO 00/11044 2/2000
WO 00/22010 4/2000
WO 01/23442 4/2001
WO 01/30864 5/2001

(Continued)

OTHER PUBLICATIONS

Kehr et al., "(N-Pyrrolyl)B(C6F5)2—A New Organometallic Lewis Acid for the Generation of Group 4 Metallocene Cation Complexes", Chem. Eur. J., 2000, vol. 6, No. 2, pp. 258-266.
Lapointe et al., "New Family of Weakly Coordinating Anions", J. Am. Chem. Soc., 2000, vol. 122, pp. 9560-9561.
Nam et al., "Propene Polymerization with Stereospecific Metallocene Dichloride-[Ph3C][B(C6F5)4] Using omega-Alkenylaluminum as an Alkylation Reagent and as a Functional Comonomer", Macromolecules, 2002, vol. 35, pp. 6760-6762.

(Continued)

*Primary Examiner* — Catherine S Branch

(57) ABSTRACT

This invention relates to organoaluminum activators, organoaluminum activator systems, preferably supported, to polymerization catalyst systems containing these activator systems and to polymerization processes utilizing the same. In particular, this invention relates to catalyst systems comprising an ion-exchange layered silicate, an organoaluminum activator, and a metallocene.

39 Claims, No Drawings

(56) References Cited

FOREIGN PATENT DOCUMENTS

| | | |
|---|---|---|
| WO | 01/42320 | 6/2001 |
| WO | 02/102811 | 12/2002 |
| WO | 03/064433 | 8/2003 |
| WO | 03/064435 | 8/2003 |
| WO | 2007/035492 | 3/2007 |
| WO | 2011/028523 | 3/2011 |

OTHER PUBLICATIONS

Tanaka et al., "Pseudo-living Copolymerization of Norbornene and omega-alkenylborane—Synthesis of Monodisperse Functionalized Cycloolefin Copolymer," Polymer, vol. 56, 2005, pp. 218-222.

Ibragimov et al., "Organometallic Chemistry," Russian Chemical Bulletin, 1998, vol. 47, No. 4, pp. 691-694.

ORGANOALUMINUM ACTIVATORS ON CLAYS

PRIORITY

This application claims priority to and the benefit of U.S. Ser. No. 62/329,453, filed Apr. 29, 2016 and is incorporated by reference in its entirety.

FIELD OF THE INVENTION

This invention relates to catalyst systems comprising an ion-exchange layered silicate, a catalyst compound (such as a metallocene) and an organoaluminum activator.

BACKGROUND OF THE INVENTION

Metallocene olefin polymerization catalyst systems typically use an activator (also called a co-catalyst) to generate the active catalytic species. In general, there are two catalyst activator families: partially hydrolyzed aluminum alkyl complexes and non-coordinating anions (NCA's). Some of the most commonly employed activators used today are the partially hydrolyzed aluminum alkyls, more specifically, alumoxanes, such as methylalumoxane (MAO). In general, metallocene olefin polymerization systems that utilize NCA-type activators are more active than their MAO counterparts, but are also quite costly and much more sensitive to poisons which present a problem in catalyst synthesis, handling, storage and reactor operation. Alternatively, MAO-based systems are more robust than their NCA-type counterparts, but they suffer from the high cost of MAO production, the fact that MAO is typically used in large excess (relative to the amount of metallocene) and the limited shelf life of MAO.

In order to enhance polymer morphology, metallocene polymerization catalysts operated in industrial slurry and gas phase processes are typically immobilized on a carrier or a support, such as alumina or silica. Metallocenes are supported to enhance the morphology of the forming polymeric particles such that they achieve a shape and density that improves reactor operability and ease of handling. However, the supported versions of metallocene polymerization catalysts tend to have lower activity as compared to their homogeneous counterparts. In general, metallocene and single-site catalysts are immobilized on silica supports.

Alternative supports for metallocene and single-site catalysts have been the subject of numerous ongoing research projects. In particular, metallocenes supported on clay or ion-exchanged layered compounds have generated a great deal of interest. Olefin polymerization catalysts using clay, clay mineral, or acid/salt-treated (or a combination of both) ion-exchange layered compounds, an organoaluminum compound and a metallocene as components have been reported (see EP 0 511 665; and U.S. Pat. No. 5,308,811). Likewise, U.S. Pat. Nos. 5,928,982 and 5,973,084 report olefin polymerization catalysts containing an acid or salt-treated (or a combination of both) ion exchange layered silicate, containing less than 1% by weight water, an organoaluminum compound and a metallocene. Furthermore, WO 01/42320 discloses combinations of clay or clay derivatives as a catalyst support, an activator comprising any Group 1-12 metal or Group 13 metalloid, other than an organoaluminum compound, and a Group 3-13 metal complex. Also, U.S. Pat. No. 6,531,552 and EP 1 160 261 report an olefin polymerization catalyst of an ion-exchange layered compound having particular acid strength and acid site densities. US 2003/0027950 reports an olefin polymerization catalyst utilizing ion-exchange layered silicates with a specific pore size distribution and having a carrier strength within a specific range.

Likewise, alternative activators for metallocenes and other single-site polymerization catalysts have been the subject of numerous research efforts in recent years. For example, perfluorophenyl aluminum and borane complexes containing one anionic nitrogen-containing group may activate metallocenes. For example, R. E. Lapointe, G. R. Roof, K. A. Abboud, J. Klosin, J. Am. Chem. Soc. 2000, 122, pp. 9560-9561, and WO 01/23442 report the synthesis of $(C_6F_5)_3Al(imidazole)[Al(C_6F_5)_3][HNR'R'']$. In addition, G. Kehr, R. Frohlich, B Wibbeling, G. Erker, Chem. Eur. J., 2000, 6, No. 2, 258-266 report the synthesis of (N-Pyrrolyl) $B(C_6F_5)_2$. Supported activators containing a Group 13 element and at least one halogenated, nitrogen-containing aromatic group ligand for polymerization catalysts have been reported (U.S. Pat. Nos. 6,147,173 and 6,211,105).

Macromolecules, 2002, 35, pp. 6760-6762 discloses propene polymerization with tetrakis(pentafluorophenyl)borate, 7-octenyldiisobutylaluminum, and rac$Me_2Si$(2-Me-Indenyl)$_2ZrCl_2$ or $Ph_2C$(cyclopentadienyl)(fluorenyl)$ZrCl_2$ to produce polypropylene with octenyldiisobutylaluminum incorporated as a comonomer.

Other references of interest include: US 2003/104928; WO 2003/064433; U.S. Pat. No. 6,489,480; US 2002/038036; WO 2002/102811; U.S. Pat. Nos. 6,414,162; 6,040,261; 6,239,062; 6,376,629; 6,451,724; JP 2002-069116A; JP 2002-0253486A; US 2003/0027950; JP 2002-037812A; JP 2002-020415A; JP 2002-060411A; JP 2001-316415A; JP 2001-316414A; U.S. Pat. No. 6,531,552; JP 2001-200010A; JP 2001-163909A; JP 2001-163908A; WO 2001/30864; JP 2001-026613A; JP 2001-031720A; JP 2000-198812A; WO 2000/22010; JP 2000-072813A; WO 2000/11044; U.S. Pat. Nos. 6,353,063; 6,376,416; JP 11255816A (1999 Sep. 21); JP 11166012A (1999 Jun. 22); JP 11166011A (1999 Jun. 22); U.S. Pat. No. 6,048,817; JP 05025214A (1993 Feb. 2); WO 2003/064433; WO 2003/0644435; JP 2004-83773; US 2007/0185343; US 2005/0267273; US 2005/0245701; US 2013/0289227; U.S. Pat. Nos. 3,624,057; 4,874,734; 5,122,491; 5,155,078; 5,234,878; 5,654,248; US 2006/0155083; Polymer, Vol. 56, (2015), pp. 218-222; and WO 2007/035492.

Given the high cost, low stability and reduced activity of MAO-based metallocene polymerization systems, there is a need in the art for new inexpensive, stable and supportable polymerization catalyst activator compounds.

SUMMARY OF THE INVENTION

This invention relates to organoaluminum activators that satisfy the need for inexpensive, stable and supportable polymerization catalyst activator compounds. In particular, the invention relates to supported activators comprising the product of the combination of an ion-exchange layered silicate, the organoaluminum activator, and optionally, a catalyst compound, such as a metallocene catalyst. This invention further relates to catalyst systems comprising metallocene catalyst compounds and such supported activators, as well as processes to polymerize unsaturated monomers using the supported activators.

This invention further relates to catalyst systems comprising an ion-exchange layered silicate, a catalyst compound, preferably a metallocene catalyst, and an organoaluminum activator represented by the formula:

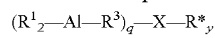

$$(R^1{}_2\text{—Al—}R^3)_q\text{—X—}R^*{}_y$$

wherein each $R^1$, independently, is a $C_1$-$C_{40}$ alkyl group; each $R^3$, independently, is a $C_2$-$C_{20}$ hydrocarbon; each R*, independently, is a hydrogen atom or a $C_1$-$C_{40}$ alkyl group; X is carbon or silicon; y is 0, 1, 2, or 3; q is 1, 2, 3, or 4, preferably 2, 3, or 4; q+y=4; and q is 2, 3, or 4 if X is carbon.

This invention also relates to organoaluminum activators which are the reaction product(s) of an alkyl aluminum and an alkene terminated compound. The alkyl aluminum and alkene terminated compound are combined and heated to produce the organoaluminum activator(s), which is useful as an activator and/or a scavenger when utilized with metallocene catalysts to prepare polymers, such as polyethylene or polypropylene.

DETAILED DESCRIPTION OF THE INVENTION

This invention relates to supported activators (or scavengers) comprising the product of the combination of an ion-exchange layered silicate, an organoaluminum activator and, optionally, a metallocene catalyst. The invention also relates to an organoaluminum activator and a metallocene catalyst that are combined to provide a catalyst system.

For the purposes of this patent specification and the claims thereto, the terms "cocatalyst" and "activator" are used herein interchangeably and are defined to be any compound which can activate any one of the catalyst compounds described herein by converting the neutral catalyst compound to a catalytically active catalyst compound cation. The term "catalyst" refers to a metal compound that when combined with an activator polymerizes olefins, and the term "catalyst system" refers to the combination of a catalyst and an activator with a support. The terms "support" or "carrier," for purposes of this patent specification, are used interchangeably and are ion-exchange layered silicates.

When "catalyst system" is used to describe such the catalyst compound/activator combination before activation, it means the unactivated catalyst complex (pre-catalyst) together with an activator and, optionally, a co-activator. When it is used to describe the combination after activation, it means the activated complex and the activator or other charge-balancing moiety. The transition metal compound may be neutral as in a pre-catalyst, or a charged species with a counter ion as in an activated catalyst system. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the catalyst may be described as a catalyst precursor, pre-catalyst compound, catalyst compound, transition metal complex, or transition metal compound, and these terms are used interchangeably. A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion. Activator and cocatalyst are also used interchangeably.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. Often, a co-activator can be pre-mixed with the transition metal compound to form an alkylated transition metal compound.

As used herein, the new notation for the Periodic Table Groups is used as described in Chemical and Engineering News, 63(5), p. 27 (1985).

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least one halogen (such as Br, Cl, F or I) or at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like, or where at least one heteroatom has been inserted within a hydrocarbyl ring. For purposes of this disclosure, "hydrocarbenyl" means a hydrocarbyl radical containing at least one olefinic double bond.

The term "substituted" means that a hydrogen group has been replaced with a hydrocarbyl group, a heteroatom, or a heteroatom-containing group. For example, methyl cyclopentadiene (Cp) is a Cp group substituted with a methyl group and ethyl alcohol is an ethyl group substituted with an —OH group.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to, ethylene and or propylene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. "Different" as used to refer to mer units indicates that the mer units differ from each other by at least one atom or are different isomerically. An ethylene polymer (or ethylene copolymer) is a polymer having at least 50 mol % of ethylene, a propylene polymer (or propylene copolymer) is a polymer having at least 50 mol % of propylene, and so on.

For the purposes of this invention and the claims thereto, the term "alpha olefin" refers to an olefin where the carbon-carbon double bond occurs between the alpha and beta carbons of the chain. Alpha olefins may be represented by the formula: $H_2C{=}CH{-}R^*$, wherein each R* is independently, hydrogen or a $C_1$ to $C_{30}$ hydrocarbyl; preferably, a $C_2$ to $C_{20}$ hydrocarbyl; preferably, a $C_3$ to $C_{12}$ hydrocarbyl; preferably, methyl, ethyl, propyl, butyl, pentyl, heptyl, octyl, nonyl, decyl, undecyl, dodecyl, and substituted analogs thereof. For example, ethylene, propylene, 1-butene, 1-pentene, 1-hexene, 1-heptene, 1-octene, 1-nonene, and 1-decene are alpha olefins that are particularly useful in embodiments herein. For the purposes of this invention, ethylene shall be considered an alpha-olefin.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties.

As used herein, $M_n$ is number average molecular weight, $M_w$ is weight average molecular weight, and $M_z$ is z average molecular weight, wt % is weight percent, and mol % is mole percent. Molecular weight distribution (MWD), also referred to as polydispersity (PDI), is defined to be $M_w$ divided by $M_n$. Unless otherwise noted, all molecular weight units (e.g., $M_w$, $M_n$, and $M_z$) are g/mol.

Unless otherwise noted all melting points (Tm) are DSC second melt.

The term "continuous" means a system that operates without interruption or cessation. For example, a continuous process to produce a polymer would be one where the reactants are continually introduced into one or more reactors and polymer product is continually withdrawn.

The following abbreviations may be used herein: Me is methyl, Et is ethyl, Pr is propyl, cPR is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bz is benzyl, MAO is methylalumoxane, Ind is indenyl, Cp is cyclopentadienyl, Flu is fluorenyl, RT is room temperature (25° C., unless otherwise indicated), and TnOAl is tri-n-octyl aluminum.

Alkyl Aluminum Compounds

Alkyl aluminum compounds are represented by the formula (I):

$$AlR_3$$

wherein each R is independently, a hydrogen atom or a substituted or unsubstituted alkyl group and/or a substituted or unsubstituted aryl group. Optionally, one or more R groups can be a hydrogen atom. In one aspect, one or more R groups is an alkyl group containing 1 to 30 carbon atoms. Suitable R groups include methyl, ethyl, propyl, butyl, isobutyl, pentyl, hexyl, heptyl, octyl, nonyl, decyl, undecyl, dodecyl, aryl, and all isomers thereof. Trialkylaluminum compounds and dialkylaluminum compounds are suitable examples.

Organoaluminum Activators

The catalyst systems described herein comprise an organoaluminum activator. In any embodiment, the organoaluminum activator is typically represented by the formula (II):

$$(R^1{}_2\text{—Al—}R^3)_q\text{—X—}R^*{}_y$$

wherein each $R^1$, independently, is a $C_1$-$C_{40}$ alkyl group; each $R^3$, independently, is a $C_2$-$C_{20}$ hydrocarbon; each R*, independently, is a hydrogen atom or a $C_1$-$C_{40}$ alkyl group; X is carbon or silicon; y is 0, 1, 2, or 3; q is 1, 2, 3, or 4; q+y=4; and q is 2, 3, or 4 if X is carbon.

In any embodiment of any formula for the organoaluminum activator, such as formula II, described herein, each $R^1$ may be independently chosen from $C_1$ to $C_{30}$ hydrocarbyl groups (such as a $C_1$ to $C_{20}$ alkyl groups, preferably methyl, ethyl, propyl, butyl, pentyl, hexyl, heptyl, octyl, nonyl, decyl, undecyl, dodecyl, or an isomer thereof), preferably isobutyl. In any embodiment, each $R^3$ hydrocarbon may be independently represented by the formula (III):

$$\text{—}(CH_2)_n\text{—}$$

where n is an integer from 2 to 20, preferably between 2 and 10, more preferably 2 to 5, ideally 2. In any embodiment, any of $R^1$, $R^3$, and R* may be substituted.

Preferred organoaluminum activators have multiple alkyl aluminum moieties. That is, q in formula (II) is preferably greater than or equal to 2, ideally 2 or 4. Without wishing to be bound by theory, it is believed that by having multiple alkyl aluminum moieties, the organoaluminum activator has a dual functionality of both activating the ion-exchanged layer silicate support and acting as a scavenger through one or more unreacted pendant alkyl aluminum moieties.

Useful organoaluminum activators include reaction products between an alkyl aluminum ($AlR_3$) and an alkene terminated compound represented by the formula (IV):

$$X(R')_{4-v}\text{—}(R^4)_v$$

where X is Si or C, $R^4$ is a hydrocarbenyl group containing 2 to 20 carbon atoms having an alkene terminus, R' is a hydrogen atom or a hydrocarbyl group containing 1 to 30 carbon atoms, v 1, 2, 3, or 4, and v is 2, 3, or 4 if X is C. Preferably, each R' is independently chosen from $C_1$ to $C_{20}$ alkyl groups, preferably methyl, ethyl, propyl, butyl, pentyl, hexyl, heptyl, octyl, nonyl, decyl, undecyl, dodecyl, or an isomer thereof, and each $R^4$ is independently represented by the formula (V):

$$\text{—}(CH_2)_mCH\text{=}CH_2$$

where m is an integer from 0 to 18, preferably between 0 to 10, preferably between 0 to 5. In any embodiment, either or both of $R^1$ and $R^4$ may be substituted.

Preferably, the alkene terminated compound has at least two alkene termini. Preferably, the alkene terminated compound is vinyl terminated. Preferred vinyl terminated compounds include multivinylsilanes. Exemplary multivinylsilanes include tetravinylsilane, methyltrivinylsilane, dimethyldivinylsilane, diethyldivinylsilane, di-n-dodecyldivinylsilane, cyclohexyltrivinylsilane, phenyltrivinylsilane, methylphenyldivinylsilane, benzyltrivinylsilane, (3-ethylcyclohexyl) (3-n-butylphenyl)divinylsilane, and the like.

Useful organoaluminum activators can be prepared by combining a trialkylaluminum or a dialkylaluminum hydride with an alkene terminated compound and heating to a temperature that causes insertion of the unsaturated alkene terminus of the alkene terminated compound into the alkyl aluminum. The use of solvent(s) is not required. However, non-polar solvents can be employed, such as, as hexane, pentane, toluene, benzene, xylenes, or combinations thereof. After the reaction is complete, solvent, if present, can be removed and the product can be used directly without further purification.

Catalyst Compositions

The supported or unsupported organoaluminum activators described herein may be used to activate metallocene catalyst compositions. Often, the metallocene catalyst compounds for use herein are represented by the formula (VIa):

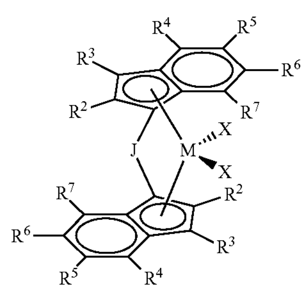

or by the formula (VIb):

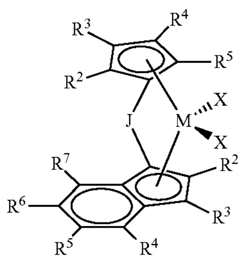

where: (1) J is a divalent bridging group (preferably comprising C, Si, or both); (2) M is a group 4 transition metal (preferably Hf or Zr); (3) each X is independently an anionic ligand, or two Xs are joined and bound to the metal atom to form a metallocycle ring, or two Xs are joined to form a chelating ligand, a diene ligand, or an alkylidene ligand; and (4) each $R^2$, $R^3$, $R^4$, $R^5$, $R^6$, and $R^7$ is independently hydrogen, $C_1$-$C_{50}$ substituted or unsubstituted hydrocarbyl (such as $C_1$-$C_{50}$ substituted or unsubstituted halocarbyl), provided that any one or more of the pairs $R^4$ and $R^5$, $R^5$ and $R^6$, and $R^6$ and $R^7$ may optionally be bonded together to form a saturated or partially saturated cyclic or fused ring structure.

In any embodiment, each X may be, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof. Two Xs may form a part of a fused ring or a ring system. In particular embodiments of the invention, each X is independently selected from halides and $C_1$ to $C_5$ alkyl groups. For instance, each X may be a chloro, bromo, methyl, ethyl, propyl, butyl or pentyl group. In specific embodiments, each X is a methyl group.

In any embodiment, each $R^2$, $R^3$, $R^4$, $R^5$, $R^6$, and $R^7$ may be independently hydrogen, hydrocarbyl or substituted hydrocarbyl; preferably selected from the group consisting of: H, $CH_3$; $CH_2CH_3$; $CH_2CH_2CH_3$; $CH_2(CH_2)_2CH_3$; $CH_2(CH_2)_{3-30}CH_3$; $CH_2C(CH_3)_3$; —CH═$CH_2$; $CH(CH_3)_2$; —$CH_2CH(CH_3)_2$; —$CH_2CH_2CH(CH_3)_2$; —$C(CH_3)_2CH(CH_3)_2$; $CH(C(CH_3)_3)CH(CH_3)_2$; $C(CH_3)_3$; $CH_2C(CH_3)_3$; $CH_2Si(CH_3)_3$; $CH_2Ph$; $C_3H_5$, $C_4H_7$; $C_5H_9$; $C_6H_{11}$; $C_7H_{13}$; $C_8H_{15}$; —$C_9H_{17}$; $CH_2Si(CH_3)_3$; —$CH_2CH$═$CH_2$; $CH_2CH_2CH$═$CH_2$; $CH_2CH_2(CF_2)_7CF_3$; $CF_3$; $N(CH_3)_2$; —$N(C_2H_5)_2$; and $OC(CH_3)_3$.

Often, each $R^2$, $R^3$, $R^4$, $R^5$, $R^6$, and $R^7$ is independently selected from hydrogen, or $C_1$-$C_{10}$ alkyl (preferably hydrogen, methyl, ethyl, propyl, butyl, pentyl, heptyl, hexyl, octyl, nonyl, decyl, or an isomer thereof). Often, each $R^3$ is hydrogen; each $R^4$ is independently a $C_1$-$C_{10}$ alkyl (preferably methyl, ethyl, propyl, butyl, pentyl, heptyl, hexyl, octyl, nonyl, decyl, or an isomer thereof); each $R^2$ and $R^7$ are independently hydrogen, or $C_1$-$C_{10}$ alkyl (preferably hydrogen, methyl, ethyl, propyl, butyl, pentyl, heptyl, hexyl, octyl, nonyl, decyl, or an isomer thereof); each $R^5$ and $R^6$ are independently hydrogen, or $C_1$-$C_{50}$ substituted or unsubstituted hydrocarbyl (preferably hydrogen, methyl, ethyl, propyl, butyl, pentyl, heptyl, hexyl, octyl, nonyl, decyl, or an isomer thereof); and $R^4$ and $R^5$, $R^5$ and $R^6$, and/or $R^6$ and $R^7$ may optionally be bonded together to form a ring structure.

In any embodiment, each $R^2$ may independently be a $C_1$ to $C_3$ alkyl group, preferably methyl, ethyl, n-propyl, isopropyl or cyclopropyl, each $R^3$, $R^5$, $R^6$, and $R^7$ may be hydrogen, and each $R^4$ may independently be a $C_1$ to $C_4$ alkyl group, preferably methyl, ethyl, n-propyl, cyclopropyl, or n-butyl. Alternatively, each $R^2$ may be a $C_1$ to $C_3$ alkyl group, preferably methyl, ethyl, n-propyl, isopropyl or cyclopropyl, each $R^3$, $R^5$, and $R^6$ may be hydrogen, and $R^4$ and $R^7$ may be, independently, a $C_1$ to $C_4$ alkyl group, preferably methyl, ethyl, propyl, butyl, or an isomer thereof. Yet alternatively, each $R^2$, $R^4$, and $R^7$ may independently be methyl, ethyl, or n-propyl, each $R^5$ and $R^6$ may independently be a $C_1$ to $C_{10}$ alkyl group, preferably methyl, ethyl, propyl, butyl, pentyl, heptyl, hexyl, octyl, nonyl, decyl or an isomer thereof, $R^3$ may be hydrogen, and $R^5$ and $R^6$ may be joined together to form a 5-membered partially unsaturated ring. Often, each $R^2$, $R^4$ and $R^7$ are the same and are selected from the group consisting of $C_1$ to $C_3$ alkyl group, preferably methyl, ethyl, propyl, and isomers thereof, and $R^3$, $R^5$ and $R^6$ are hydrogen.

Often, $R^4$ is not an aryl group (substituted or unsubstituted). An aryl group is defined to be a single or multiple fused ring group where at least one ring is aromatic. A substituted aryl group is an aryl group where a hydrogen has been replaced by a heteroatom or heteroatom-containing group. Examples of substituted and unsubstituted aryl groups include phenyl, benzyl, tolyl, carbazolyl, naphthyl, and the like. Likewise, often, $R^2$, $R^4$ and $R^7$ are not a substituted or unsubstituted aryl group. Likewise, often, $R^2$, $R^4$, $R^5$, $R^6$, and $R^7$ are not a substituted or unsubstituted aryl group.

J may be represented by the formula (VIc):

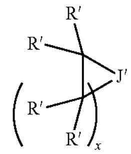

wherein J' is a carbon or silicon atom, x is 1, 2, 3, or 4, preferably 2 or 3, and each R' is, independently, hydrogen or $C_1$-$C_{10}$ hydrocarbyl, preferably hydrogen. Particular examples of J groups where J' is silicon include cyclopentamethylenesilylene, cyclotetramethylenesilylene, cyclotrimethylenesilylene, and the like. Particular examples of J groups where J' is carbon include cyclopropandiyl, cyclobutandiyl, cyclopentandiyl, cyclohexandiyl, and the like.

In any embodiment, J may be represented by the formula $(R^a{}_2J')_n$ where each J' is independently C or Si, n is 1 or 2, and each $R^a$ is, independently, $C_1$ to $C_{20}$ substituted or unsubstituted hydrocarbyl, provided that two or more $R^a$ optionally may be joined together to form a saturated or partially saturated or aromatic cyclic or fused ring structure that incorporates at least one J'. Particular examples of J groups include dimethylsilylene, diethylsilylene, isopropylene, ethylene, and the like.

Often, the metallocene compound used herein is at least 90% rac isomer and the indenyl groups are substituted at the 4 position with a $C_1$ to $C_{10}$ alkyl group, the 3 position is hydrogen, the bridge is carbon or silicon which is incorporated into a 4, 5, or 6 membered ring. For instance, the catalyst compound may be either the rac or meso form of cyclotetramethylenesilylene-bis(2,4,7-trimethylinden-1-yl) hafnium dimethyl, shown below:

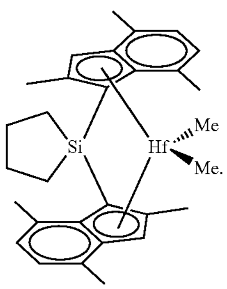

As noted, the catalyst compounds can be in rac or meso form. For instance, at least 90 wt % of the catalyst compound may be in the rac form, based upon the weight of the rac and meso forms present. More particularly, at least any one of about 92 wt %, 93 wt %, 94 wt %, 95 wt %, 96 wt %, 97 wt %, 98 wt %, and 99 wt % of the catalyst compound may be in rac form. For example, all of the catalyst compounds may be in rac form.

Catalyst compounds that are particularly useful in this invention include one or more of the metallocene compounds listed and described in Paragraphs [0089]-[0090] of U.S. Ser. No. 14/325,449, filed Jul. 8, 2014, which is incorporated by reference herein. Likewise, the catalyst compounds described herein may be synthesized in any suitable manner, including in accordance with procedures described in Paragraphs [0096] and [00247]-[00298] of U.S. Ser. No. 14/325,449, filed Jul. 8, 2014.

Suitable catalyst compounds also include, for example, mono-Cp amido group 4 complexes, bridged fluorenyl-cyclopentadienyl group 4 complexes, and biphenyl phenol (BPP) transition metal complexes. Suitable mono-Cp amido group 4 complexes include compounds of the following general structural formula (VII):

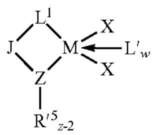

wherein: (1) M is a group 4 metal, preferably titanium; (2) $L^1$ is a divalent substituted or unsubstituted monocyclic or polycyclic arenyl ligand pi-bonded to M; (3) J is a divalent bridging group; (4) Z is a group 15 or 16 element with a coordination number of three if from group 15 or with a coordination number of two if from group 16 of the Periodic Table of Elements, and z is the coordination number of the element Z such that when Z is a group 16 element, z is 2 and $R'^5$ is absent; (5) $R'^5$ is a radical group which is a hydrocarbyl, substituted hydrocarbyl, halocarbyl, or substituted halocarbyl; (6) $L'_w$ is a neutral Lewis base and w represents the number of L' bonded to M where w is 0, 1, or 2, and optionally any L' and any X may be bonded to one another; and (7) each of the Xs are independently halogen radicals, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both Xs are joined and bound to the metal atom to form a metallacycle ring containing from about 3 to about 20 carbon atoms; or both together can be an olefin, diolefin or aryne ligand. In any embodiment, both Xs may, independently, be a halogen, alkoxide, aryloxide, amide, phosphide or other univalent anionic ligand or both Xs can also be joined to form an anionic chelating ligand. Suitable $L^1$ monocyclic or polycyclic arenyl ligands include substituted and unsubstituted cyclopentadienyl, indenyl, fluorenyl, heterocyclopentadienyl, heterophenyl, heteropentalenyl, heterocyclopentapentalenyl, heteroindenyls, heterofluorenyl, heterocyclopentanaphthyls, heterocyclopentaindenyls, heterobenzocyclopentaindenyls, and the like.

In any embodiment, the mono-Cp amido group 4 complexes may include compounds of the following general structural formula (VIIa):

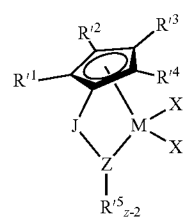

where: (1) J is a divalent bridging group, preferably comprising C, Si, or both; (2) M is a group 4 metal (for instance, Hf, Zr, or Ti, with Ti being preferred); (3) each X is independently a univalent anionic ligand, or two Xs are joined and bound to the metal atom to form a metallocycle ring, or two Xs are joined to form a chelating ligand, a diene ligand, or an alkylidene ligand; (4) each $R'^1$, $R'^2$, $R'^3$, $R'^4$, and $R'^5$ is independently hydrogen, $C_1$-$C_{50}$ hydrocarbyl, substituted hydrocarbyl, halocarbyl, or substituted halocarbyl provided that any one or more of the pairs $R'^1$ and $R'^2$, $R'^2$ and $R'^3$, and $R'^3$ and $R'^4$, may optionally be bonded together to form a saturated or partially saturated cyclic or fused ring structure; and (5) Z is a group 15 or 16 element with a coordination number of three if from group 15 or with a coordination number of two if from group 16 of the Periodic Table of Elements, and z is the coordination number of the element Z. Preferably Z is N, O, S, or P, preferably N, O, or P, preferably N. When Z is a group 16 element, z is 2 and $R'^5$ is absent.

In any embodiment, the bridging group, J, may be represented by $R^*_2C$, $R^*_2Si$, $R^*_2CCR^*_2$, $R^*C{=}CR^*$, $R^*_2CSiR^*_2$, or $R^*_2SiSiR^*_2$, where each R* is, independently, hydrogen or a $C_1$ to $C_{20}$ containing hydrocarbyl, substituted hydrocarbyl, halocarbyl, or substituted halocarbyl and optionally two or more adjacent R* may join to form a substituted or unsubstituted, saturated, partially unsaturated or aromatic, cyclic or polycyclic substituent. Alternatively, J is a bridging group comprising carbon and/or silicon atoms, such as dialkylsilyl, preferably J is selected from $CH_2$, $CH_2CH_2$, $C(CH_3)_2$, $SiMe_2$, $SiEt_2$, $SiPh_2$, SiMePh, $Ph_2C$, $(p\text{-}(Et)_3SiPh)_2C$, $Si(CH_2)_3$, $Si(CH_2)_4$ and $Si(CH_2)_5$. Alternatively, J may be any of the compounds described for “J” in the catalysts above.

In any embodiment, each X may be selected in accordance with the previously-described catalyst compounds. That is, each X may independently be selected from the group consisting of hydrocarbyl radicals having from 1 to 20 carbon atoms, halogens, hydrides, amides, alkoxides, sulfides, phosphides, halides, dienes, amines, phosphines, ethers, and a combination thereof. Two Xs may form a part of a fused ring or a ring system. Preferably, each X is independently selected from halides and $C_1$ to $C_5$ alkyl groups. For instance, each X may be a chloro, bromo, methyl, ethyl, propyl, butyl, or pentyl group. Often, each X is a methyl group.

In any embodiment, each $R'^1$, $R'^2$, $R'^3$, $R'^4$, and $R'^5$ may be independently selected from the following: H; $CH_3$; $CH_2CH_3$; $CH_2CH_2CH_3$; $CH_2(CH_2)_2CH_3$; $CH_2(CH_2)_{3-30}CH_3$; $CH_2C(CH_3)_3$; —CH═$CH_2$; $CH(CH_3)_2$; —$CH_2CH(CH_3)_2$; —$CH_2CH_2CH(CH_3)_2$; —$C(CH_3)_2CH(CH_3)_2$; $CH(C(CH_3)_3)CH(CH_3)_2$; —$C(CH_3)_3$; $CH_2Si(CH_3)_3$; —$CH_2Ph$; $C_4H_7$; —$C_5H_9$; $C_6H_{11}$; —$C_7H_{13}$; $C_8H_{15}$; —$C_9H_{17}$; $C_{12}H_{23}$, $C_{10}H_{15}$, $C_6H_5$; $CH_2Si(CH_3)_3$; $CH_2CH$═$CH_2$; $CH_2CH_2CH$═$CH_2$; $CH_2CH_2(CF_2)_7CF_3$; $CF_3$; $N(CH_3)_2$; —$N(C_2H_5)_2$; and $OC(CH_3)_3$.

Preferably, each of $R'^1$, $R'^2$, $R'^3$, and $R'^4$ is independently $C_1$-$C_{10}$ alkyl or hydrogen. For instance, each of $R'^1$, $R'^2$, $R'^3$, and $R'^4$ may be methyl or hydrogen. Often, each of $R'^1$, $R'^2$, $R'^3$, and $R'^4$ is methyl, as is the case in dimethylsilylene (tetramethylcyclopentadienyl)(cyclododecylamido)titanium dimethyl. Alternatively, one of $R'^1$, $R'^2$, $R'^3$, and $R'^4$ is hydrogen, the remaining $R'^1$, $R'^2$, $R'^3$, and $R'^4$ are each methyl, (as is the case in, e.g., dimethylsilylene(trimethylcyclopentadienyl)(cyclododecylamido)titanium dimethyl). Yet alternatively, any of the pairs $R'^1$ and $R'^2$, $R'^2$ and $R'^3$, $R'^3$ and $R'^4$ may be bonded together so as to form, together with the cyclopentadienyl moiety to which those pairs are attached, an indenyl, s-indacenyl, or as-indacenyl group (as is the case, for instance, with dimethylsilylene(6-methyl-1,2,3,5-tetrahydro-s-indacen-5-yl)(tert-butylamido)titanium dimethyl). Yet alternatively, Z is nitrogen, and $R'^5$ is selected from $C_1$-$C_{30}$ hydrocarbyl, substituted hydrocarbyl, halocarbyl, or substituted halocarbyl groups. Yet alternatively, Z is nitrogen, and $R'^5$ is a $C_1$ to $C_{12}$ hydrocarbyl group such as methyl, ethyl, propyl (n- or iso-), butyl (n-, iso-, sec-, or tert-), etc. For instance, $R'^5$ may be tert-butyl. Alternatively, $R'^5$ in certain embodiments may be a cyclic group, e.g., adamantyl, cyclopropyl, cyclobutyl, cyclopentyl, cyclohexyl, cycloheptyl, cyclooctyl, cyclononyl, cyclodecyl, cylcododecyl, or norbornyl. Alternatively, $R'^5$ in certain embodiments may be an aromatic group, e.g., phenyl, tolyl, naphthyl, anthracenyl, etc. Often, $R'^5$ is t-butyl and/or cyclododecyl, and preferably Z is N.

Particular examples of some suitable mono-Cp amido group 4 catalyst compounds thus include: dimethylsilylene (tetramethylcyclopentadienyl)(cyclododecylamido)titanium dimethyl; dimethylsilylene(tetramethylcyclopentadienyl) (tert-butylamido)titanium dimethyl; dimethylsilylene(tetramethylcyclopentadienyl)(adamantylamido)titanium dimethyl; dimethylsilylene(tetramethylcyclopentadienyl) (cyclooctylamido)titanium dimethyl; dimethylsilylene (tetramethylcyclopentadienyl)(cyclohexylamido)titanium dimethyl; dimethylsilylene(tetramethylcyclopentadienyl) (norbornylamido)titanium dimethyl dimethylsilylene(trimethylcyclopentadienyl)(cyclododecylamido)titanium dimethyl; dimethylsilylene(trimethylcyclopentadienyl) (adamantylamido)titanium dimethyl; dimethylsilylene (trimethylcyclopentadienyl)(tert-butylamido)titanium dimethyl; dimethylsilylene(6-methyl-1,2,3,5-tetrahydro-s-indacen-5-yl)(tert-butylamido)titanium dimethyl; dimethylsilylene(6-methyl-1,2,3,5-tetrahydro-s-indacen-5-yl)(adamantylamido)titanium dimethyl; dimethylsilylene(6-methyl-1,2,3,5-tetrahydro-s-indacen-5-yl) (cyclooctylamido)titanium dimethyl; dimethylsilylene(6-methyl-1,2,3,5-tetrahydro-s-indacen-5-yl) (cyclohexylamido)titanium dimethyl; dimethylsilylene(6-methyl-1,2,3,5-tetrahydro-s-indacen-5-yl) (cyclododecylamido)titanium dimethyl; dimethylsilylene(2,2,6-trimethyl-1,2,3,5-tetrahydro-s-indacen-5-yl) (adamantylamido)titanium dimethyl; dimethylsilylene(2,2,6-trimethyl-1,2,3,5-tetrahydro-s-indacen-5-yl) (cyclohexylamido)titanium dimethyl; dimethylsilylene(2,2,6-trimethyl-1,2,3,5-tetrahydro-s-indacen-5-yl) (cyclododecylamido)titanium dimethyl; dimethylsilylene(2,2,6-trimethyl-1,2,3,5-tetrahydro-s-indacen-5-yl)(tert-butylamido)titanium dimethyl and any combination thereof.

As noted, other suitable catalyst compounds may be characterized as bridged fluorenyl-cyclopentadienyl group 4 complexes. Suitable compounds according to such embodiments include compounds of the general formula (VIII):

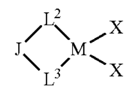

wherein: (1) M is a group 4 metal, preferably hafnium; (2) $L^2$ is a divalent substituted or unsubstituted fluorenyl, heterocyclopentapentalenyl, or heterofluorenyls ligand pi-bonded to M; (3) $L^3$ is a divalent cyclopentadienyl ring, a substituted cyclopentadienyl ring, a heterocyclopentadienyl ring, or a substituted heterocyclopentadienyl ligand pi-bonded to M; (4) J is a divalent bridging group; and (5) Xs are independently, halogen radicals, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both Xs are joined and bound to the metal atom to form a metallacycle ring containing from about 3 to about 20 carbon atoms; or both together can be an olefin, diolefin or aryne ligand. In any embodiment, both Xs may, independently, be a halogen, alkoxide, aryloxide, amide, phosphide or other univalent anionic ligand or both Xs can also be joined to form an anionic chelating ligand.

Suitable fluorenyl-cyclopentadienyl group 4 complexes include compounds of the general formula (VIIIa):

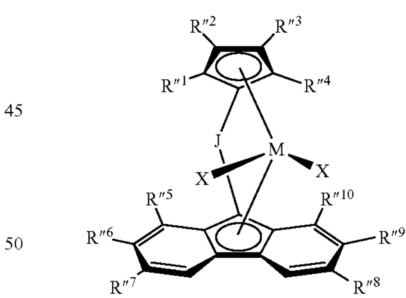

where: (1) J is a divalent bridging group preferably comprising C, Si, or both; (2) M is a group 4 metal (for instance, Hf, Zr, or Ti, with Hf being preferred); (3) each X is independently a univalent anionic ligand, or two Xs are joined and bound to the metal atom to form a metallocycle ring, or two Xs are joined to form a chelating ligand, a diene ligand, or an alkylidene ligand; and (4) each $R''^1$, $R''^2$, $R''^3$, $R''^4$, $R''^5$, $R''^6$, $R''^7$, $R''^8$, $R''^9$, and $R''^{10}$ is independently hydrogen, $C_1$-$C_{50}$ hydrocarbyl, substituted hydrocarbyl, halocarbyl, or substituted halocarbyl provided that any one or more of the pairs $R''^1$ and $R''^2$, $R''^3$ and $R''^4$, $R'^5$ and $R''^6$, $R''^6$ and $R''^7$, $R''^8$ and $R'^9$, and $R''^9$ and $R''^{10}$, may optionally be bonded together to form a saturated or partially saturated cyclic or fused ring structure. In any embodiment, the bridging group, J, may be represented by $R^*_2C$, $R^*_2Si$, $R^*_2CCR^*_2$, $R^*C{=}CR^*$, $R^*_2CSiR^*_2$, or $R^*_2SiSiR^*_2$, where each R* is, independently, hydrogen or a $C_1$ to $C_{20}$ containing hydrocarbyl or substituted hydrocarbyl and optionally two or more adjacent R* may join to form a substituted or unsubstituted, saturated, partially unsaturated or aromatic, cyclic or polycyclic substituent. In any embodiment, J may be a bridging group comprising carbon and/or silicon atoms, such as dialkylsilyl; preferably J is selected from $CH_2$, $CH_2CH_2$, $C(CH_3)_2$, $SiMe_2$, $SiEt_2$, $SiPh_2$, SiMePh, $Ph_2C$, $(p\text{-}(Et)_3SiPh)_2C$, $Si(CH_2)_3$, $Si(CH_2)_4$ and $Si(CH_2)_5$. Alternately, J may be any of the compounds described for "J" in the catalysts above.

Each X may independently be selected from the group consisting of hydrocarbyl radicals having from 1 to 20 carbon atoms, halogens, hydrides, amides, alkoxides, sulfides, phosphides, halides, dienes, amines, phosphines, ethers, and a combination thereof. Two Xs may form a part of a fused ring or a ring system. Preferably, each X is independently selected from halides and $C_1$ to $C_5$ alkyl groups. For instance, each X may be a chloro, bromo, methyl, ethyl, propyl, butyl or pentyl group. For example, each X is a methyl group.

In any embodiment, each $R''^1$, $R''^2$, $R''^3$, $R''^4$, $R''^5$, $R''^6$, $R''^7$, $R''^8$, $R''^9$, and $R''^{10}$ may be independently selected from the following: H; $CH_3$; $CH_2CH_3$; $CH_2CH_2CH_3$; $CH_2(CH_2)_2CH_3$; $CH_2(CH_2)_{3\text{-}30}CH_3$; $CH_2C(CH_3)_3$; $CH{=}CH_2$; $CH(CH_3)_2$; $—CH_2CH(CH_3)_2$; $—CH_2CH_2CH(CH_3)_2$; $C(CH_3)_2CH(CH_3)_2$; $—CH(C(CH_3)_3)CH(CH_3)_2$; $—C(CH_3)_3$; $CH_2Si(CH_3)_3$; $—CH_2Ph$; $C_4H_7$; $—C_5H_9$; $C_6H_{11}$; $—C_7H_{13}$; $C_8H_{15}$; $—C_9H_{17}$; $C_6H_5$; $—CH_2Si(CH_3)_3$; $—CH_2CH{=}CH_2$; $CH_2CH_2CH{=}CH_2$; $CH_2CH_2(CF_2)_7CF_3$; $CF_3$; $N(CH_3)_2$; $N(C_2H_5)_2$; and $OC(CH_3)_3$. Often, any one or more of $R''^1$, $R''^2$, $R''^3$, $R''^4$, $R''^5$, $R''^6$, $R''^7$, $R''^8$, $R''^9$, and $R''^{10}$ may be hydrogen, methyl, ethyl, n-propyl, i-propyl, s-butyl, i-butyl, n-butyl, t-butyl, and so on for various isomers for $C_5$ to $C_{10}$ alkyls. Often, $R''^6$ and $R''^9$ may be t-butyl. For instance, $R''^1$, $R''^2$, $R''^3$, $R''^4$, $R''^5$, $R''^7$, $R''^8$, and $R''^{10}$ may each be independently selected from H, methyl, and ethyl. Often, each $R''^1—R''^{10}$ group other than $R''^6$ and $R''^9$ is H.

In any embodiment, the fluorenyl-cyclopentadienyl group 4 complexes may be represented by the following formula (VIIIb):

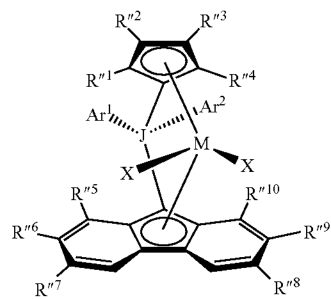

wherein M, X, $R''^1—R''^{10}$ are defined as above, J' is a silicon or carbon atom, and $Ar^1$ and $Ar^2$ are independently $C_6$-$C_{30}$ aryl or substituted aryl groups, wherein the substituents, independently, each occurrence are selected from the group consisting of hydrocarbyl, substituted hydrocarbyl, halocarbyl and substituted halocarbyl.

Often, at least one of the $Ar^1$ and $Ar^2$ contains at least one hydrocarbylsilyl substituent group having the formula $R^{*\prime}{}_nSiR''_3$, where each R" is independently a $C_1$-$C_{20}$ hydrocarbyl, substituted hydrocarbyl, halocarbyl, substituted halocarbyl, silylcarbyl, or substituted silylcarbyl substituent, R*' is a $C_1$-$C_{10}$ substituted or unsubstituted alkyl, alkenyl, and/or alkynyl linking group between Si and the aryl group, and n=0 or 1. For example, when n is 0, one or both of $Ar^1$ and $Ar^2$ may be trimethylsilylphenyl ($Me_3SiPh$), triethylsilylphenyl ($Et_3SiPh$), tripropylsilylphenyl ($Pr_3SiPh$), etc. Similarly, when n is 1, R*' is present as a linking group, for example, a $C_2$ linking group (e.g., ethyl linking group), then one or both of $Ar^1$ and $Ar^2$ may be (trimethylsilyl)ethylphenyl ($Me_3SiCH_2CH_2Ph$), and so on. Thus, for example, wherein (1) $R''^6$ and $R''^9$ are each t-butyl as discussed above; (2) $R''^1$-$R''^4$, $R''^5$, $R''^7$, $R''^8$, and $R''^{10}$ are each H, as also discussed above; (3) $Ar^1$ and $Ar^2$ are each $Et_3SiPh$; (4) J is C; (5) M is Hf; and (6) each X is methyl, an exemplary catalyst accordingly can be given as 1,1'-bis(4-triethylsilylphenyl)methylene-(cyclopentadienyl)(2,7-di-tert-butyl-fluoren-9-yl)hafnium dimethyl.

Particularly useful fluorenyl-cyclopentadienyl group 4 complexes include: dimethylsilylene(cyclopentadienyl)(2,7-di-tert-butyl-fluoren-9-yl)hafnium dimethyl; dimethylsilylene(cyclopentadienyl)(3,6-di-tert-butyl-fluoren-9-yl)hafnium dimethyl; diphenylmethylene(cyclopentadienyl)(2,7-di-tert-butyl-fluoren-9-yl)hafnium dimethyl; diphenylmethylene(cyclopentadienyl)(3,6-di-tert-butyl-fluoren-9-yl)hafnium dimethyl; isopropylidene(cyclopentadienyl)(2,7-di-tert-butyl-fluoren-9-yl)hafnium dimethyl; isopropylidene(cyclopentadienyl)(3,6-di-tert-butyl-fluoren-9-yl)hafnium dimethyl; dimethylsilylene(cyclopentadienyl)(2,7-dimethylfluoren-9-yl)hafnium dimethyl; dimethylsilylene(cyclopentadienyl)(3,6-dimethylfluoren-9-yl)hafnium dimethyl; diphenylmethylene(cyclopentadienyl)(2,7-dimethyl; diphenylmethylene(cyclopentadienyl)(3,6-dimethyl; dimethylsilylene(cyclopentadienyl)(fluoren-9-yl)hafnium dimethyl, isopropylidene(cyclopentadienyl)(fluoren-9-yl)hafnium dimethyl, diphenylmethylene(cyclopentadienyl)(fluoren-9-yl)hafnium dimethyl, and 1,1'-bis(4-triethylsilylphenyl)methylene(cyclopentadienyl)(2,7-di-tert-butyl-fluoren-9-yl)hafnium dimethyl.

Yet alternatively, suitable catalyst compounds may be characterized as chelated transition metal complexes (type 1), such as those having the following structural formula (IX):

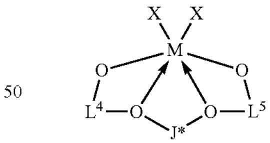

where: (1) J* is a divalent bridging group comprising C, Si, or both; (2) M is a group 4 metal, preferably hafnium and zirconium; (3) O is oxygen; (4) each X is independently a univalent anionic ligand, or two Xs are joined and bound to the metal atom to form a metallocycle ring, or two Xs are joined to form a chelating ligand, a diene ligand, or an alkylidene ligand; and (5) $L^4$ and $L^5$ are independently, a substituted monocyclic or polycyclic aromatic group.

In any embodiment, J* may be a divalent substituted or unsubstituted $C_{3\text{-}6}$ aliphatic or cycloaliphatic group. In any embodiment, $L^4$ and $L^5$ may be independently a monocyclic or polycyclic aromatic group substituted with any combination alkyl, aryl, alkoxy, or amino substituents which may optionally be substituted with halogens.

Yet alternatively, suitable catalyst compounds that are chelated transition metal complexes (type 1), may be characterized as biphenyl phenol transition metal complexes, such as those having the following structural formula (IXa):

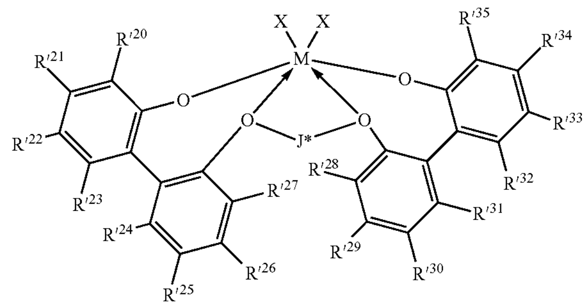

where: (1) J* is a divalent bridging group comprising C, Si, or both; (2) M is a group 4 metal, preferably hafnium and zirconium; (3) O is oxygen; (4) each X is independently a univalent anionic ligand, or two Xs are joined and bound to the metal atom to form a metallocycle ring, or two Xs are joined to form a chelating ligand, a diene ligand, or an alkylidene ligand; and (5) each R'[20], R'[21], R'[22], R'[23], R'[24], R'[25], R'[26], R'[27], R'[28], R'[29], R'[30], R'[31], R'[32], R'[33], R'[34], and R'[35] is independently hydrogen, halo, $C_1$-$C_{50}$ hydrocarbyl, substituted hydrocarbyl, halocarbyl or substituted halocarbyl.

In any embodiment, each R'[20] and R'[35] may be or may comprise a bulky substituent, such as substituted or unsubstituted aryl, carbazolyl, fluorenyl and/or anthracenyl. In other particular embodiments, each R'[20] and R'[35] independently may be 3,5-di(isopropyl)phenyl, 3,5-di(isobutyl)phenyl, 3,5-di(tert-butyl)phenyl, carbazol-9-yl, 3,6-di-tert-butylcarbazol-9-yl, 2,3,4,5,6,7,8,9-octahydrocarbazol-1-yl, anthracen-9-yl, 1,2,3,4,5,6,7,8-octahydroanthracen-9-yl, naphthyl, fluoren-9-yl, 9-methylfluoren-9-yl, 1,2,3,4,5,6,7,8-octahydrofluoren-9-yl, or 9-methyl-1,2,3,4,5,6,7,8-octahydrofluoren-9-yl. Alternatively, R'[22] and R'[33] are independently $C_1$-$C_{10}$ hydrocarbyl, alternatively $C_1$-$C_{10}$ alkyls such as methyl, ethyl and all isomers of propyl, butyl, pentyl, hexyl, heptyl, octyl, nonyl, and decyl. Yet alternatively, R'[25] and R'[30] are independently $C_1$-$C_{10}$ substituted or unsubstituted hydrocarbyl, halo, $C_1$-$C_{10}$ alkoxy, and $C_2$-$C_{20}$ dialkylamino. Alternatively, R'[25] and R'[30] are independently $C_1$-$C_{10}$ alkyls such as methyl, ethyl, and all isomers of propyl, butyl, pentyl, hexyl, heptyl, octyl, nonyl, and decyl (including cyclic and linear or branched cyclic combinations); halogens such as fluoro, chloro, and bromo; $C_1$-$C_{10}$ alkoxy such as methoxy, ethoxy, and all isomers of propoxy, butoxy, pentoxy, hexoxy, heptoxy, octoxy, nonoxy, and decoxy (including cyclic and linear or branched cyclic combinations); $C_2$-$C_{20}$ dialkylamino such as dimethyl amino, diethyl amino, and all isomers of dipropylamino, dibutylamino, dipentylamino, dihexylamino, diheptylamino, dioctylamino, dinonylamino, didecylamino (including cyclic and linear or branched cyclic combinations) and mixed alkyls such as methylethylamino, methylbutyl amino and the like. Often, J* may be propan-1,3-diyl, butan-1,4-diyl, cyclohexanediyl, cyclohexen-4,5-diyl, or bis(methylene)cyclohexan-1,2-diyl.

Non-limiting examples of particularly useful biphenyl phenol transition metal complexes are illustrated below, wherein M is hafnium or zirconium and X is methyl, benzyl, or chloro:

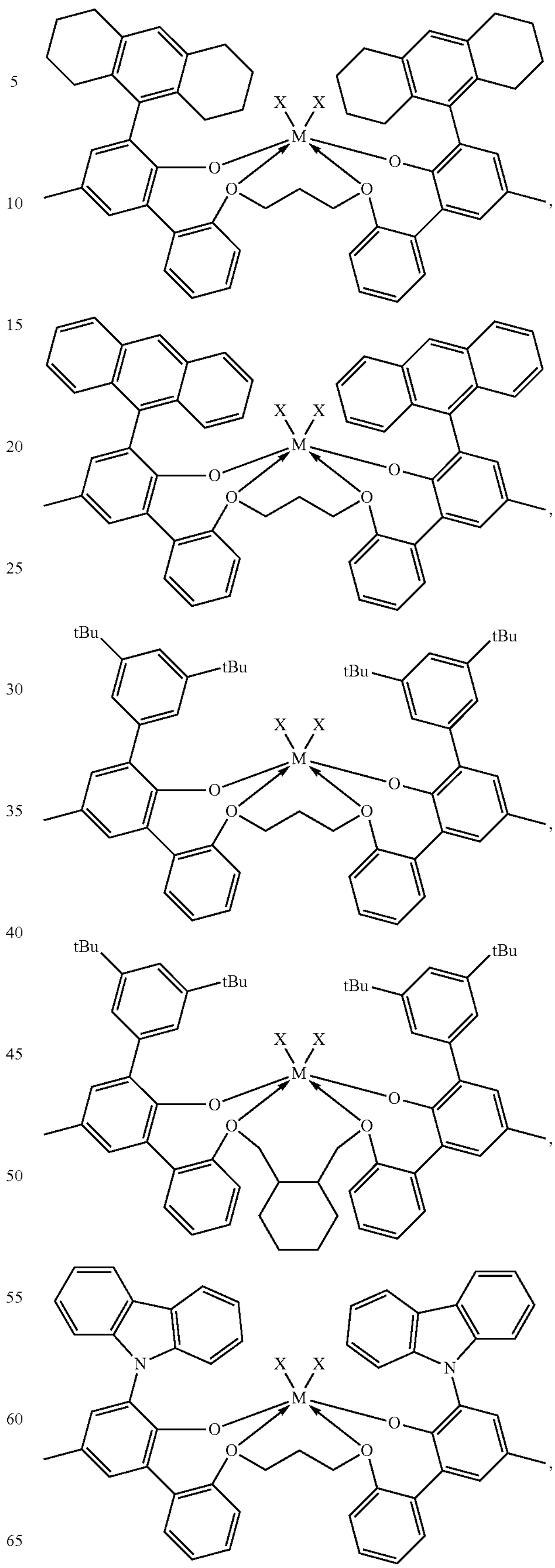

-continued

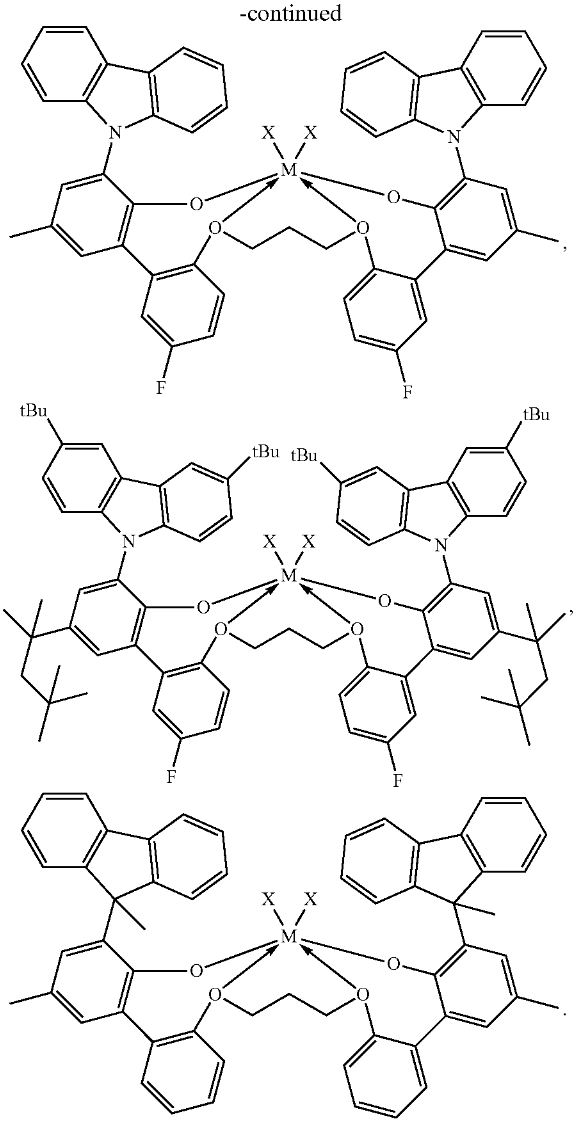

Additional particularly useful biphenyl phenol transition metal complexes are described in WO 2003/091262; WO 2005/108406; US 2006/0025548; US 2006/0052554; WO 2007/136494; WO 2007/136496; WO 2007/136495; WO 2009/064482; and WO 2013/096573, and are incorporated by reference.

Yet alternatively, suitable catalyst compounds may be characterized as chelated transition metal complexes (type 2), such as those having the following structural formula (X):

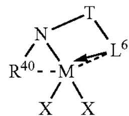

wherein (1) M is a group 4 metal, preferably hafnium; (2) $L^6$ is a $C_5$-$C_{20}$ heteroaryl group containing a Lewis base functionality, especially pyridine-2-yl or substituted pyridine-2-yl group or a divalent derivative thereof; (3) $R^{40}$ is selected from a $C_1$-$C_{30}$ alkyl, cycloalkyl, heteroalkyl, cycloheteroalkyl, aryl, and substituted derivatives thereof or a divalent derivative thereof; (4) T is a divalent bridging group comprising carbon and or silicon, preferably a $C_1$-$C_{20}$ hydrocarbyl substituted methylene or silane group; (5) each X is independently a univalent anionic ligand, or two Xs are joined and bound to the metal atom to form a metallocycle ring, or two Xs are joined to form a chelating ligand, a diene ligand, or an alkylidene ligand; (6) N is nitrogen; and (7) bonds, optional bonds and dative bonds are represented by lines, dotted lines and arrows, respectively.

Yet alternatively, suitable catalyst compounds that are chelated transition metal complexes (type 2), may be characterized as pyridyl amide metal complexes, such as those having the following structural formula (Xa):

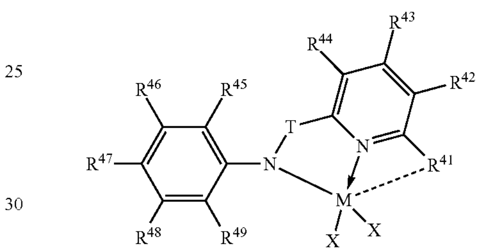

wherein M, T, N, and X are as previously defined as in formula (5); each $R^{41}$, $R^{42}$, $R^{43}$, and $R^{44}$ are independently hydrogen, halo, or an alkyl, cycloalkyl, heteroalkyl, heterocycloalkyl, aryl or silyl group, or one or more adjacent $R^{41}$—$R^{44}$ may be joined together to form a fused ring derivative; $R^{45}$—$R^{49}$ are independently hydrogen, or $C_1$-$C_{10}$ alkyl, most preferably $R^{45}$ and $R^{49}$ are alkyl such as isopropyl or tert-butyl; T is preferably $CR'^{50}R'^{51}$ where $R'^{50}$ and $R'^{51}$ are independently hydrogen, halogen, a $C_1$-$C_{20}$ hydrocarbyl, most preferably, one of $R'^{50}$ and $R'^{51}$ is hydrogen and the other is a $C_6$-$C_{20}$ aryl group, especially 2-isopropyl, phenyl or a fused polycyclic aryl group, most preferably anthracenyl; and bonds, optional bonds and dative bonds are represented by lines, dotted lines and arrows, respectively.

Non-limiting examples of pyridyl amide catalysts that are chelated transition metal complexes (type 2) are illustrated below, wherein X is preferably methyl, benzyl or chloro:

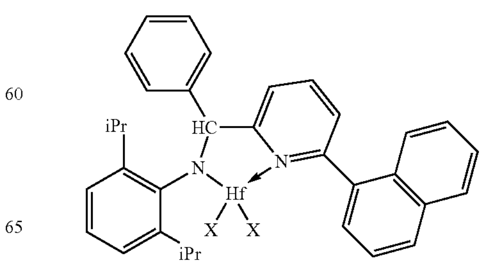

-continued

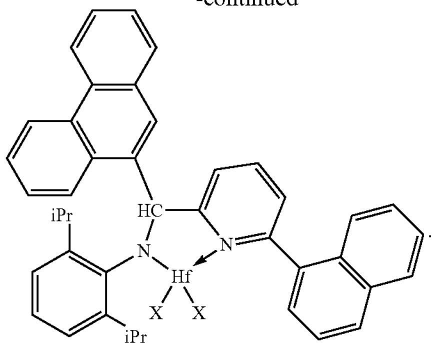

Additional particularly useful chelated transition metal complexes (type 2) including pyridyl amide transition metal complexes are described in WO 2010/0227990; US 2004/0220050; WO 2004/026925; WO 2004/024740; WO 2004/024739; WO 2003/040201; WO 2002/046249; and WO 2002/038628 are incorporated by reference.

Yet alternatively, suitable catalyst compounds may be characterized as chelated transition metal complexes (type 3), such as those having the following structural formula (XI):

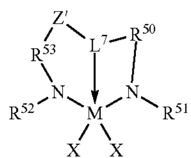

wherein (1) M is a group 4 metal, preferably hafnium; (2) N is nitrogen; (3) $L^7$ is a group that links $R^{50}$ to Z' by a three atom bridge with the central of the three atoms being a group 15 or 16 element that preferably forms a dative bond to M, and is a $C_5$-$C_{20}$ heteroaryl group containing a Lewis base functionality, especially a divalent pyridinyl or substituted pyridinyl group; (4) Z' is a divalent linker group, $(R^{56})_pC—C(R^{57})_q$, where $R^{56}$ and $R^{57}$ are independently selected from the group consisting of hydrogen, hydrocarbyls, substituted hydrocarbyls, and wherein adjacent $R^{56}$ and $R^{57}$ groups may be joined to form an aromatic or saturated, substituted or unsubstituted hydrocarbyl ring, wherein the ring has 5, 6, 7, or 8 ring carbon atoms and where the substituents on the ring can join to form additional rings, and p is 1 or 2 and q is 1 or 2; (5) $R^{50}$ and $R^{53}$ are each, independently, $ER^{54}R^{55}$ with E being carbon, silicon or germanium, and each $R^{54}$ and $R^{55}$ being independently selected from the group consisting of hydrogen, hydrocarbyls, substituted hydrocarbyls, alkoxy, silyl, amino, aryloxy, halogen and phosphino, and $R^{54}$ and $R^{55}$ may be joined to form a saturated heterocyclic ring, or a saturated substituted heterocyclic ring where substitutions on the ring can join to form additional rings; (6) $R^{51}$ and $R^{52}$ are independently selected from the group consisting of hydrocarbyls, substituted hydrocarbyls, silylcarbyls and substituted silylcarbyl groups; and (7) each X is independently a univalent anionic ligand, or two Xs are joined and bound to the metal atom to form a metallocycle ring, or two Xs are joined to form a chelating ligand, a diene ligand, or an alkylidene ligand.

Yet alternatively, suitable catalyst compounds that are chelated transition metal complexes (type 3), may be characterized as pyridyl diamide metal complexes, such as those having the following structural formula (XIa):

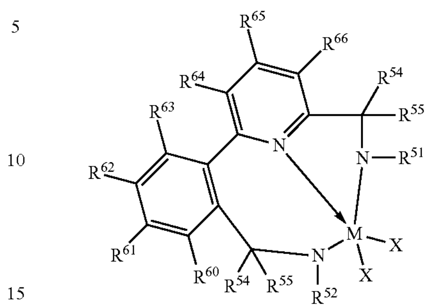

wherein M, X, N, $R^{51}$, $R^{52}$, $R^{54}$, and $R^{55}$ are as previously defined as in formula (6); $R^{60}$, $R^{61}$, $R^{62}$, $R^{63}$, $R^{64}$, $R^{65}$, and $R^{66}$ are independently selected from the group consisting of hydrogen, hydrocarbyls, substituted hydrocarbyls, alkoxy, aryloxy, halogen, amino, and silyl, and wherein any one or more adjacent $R^{60}$-$R^{66}$ may be joined to form a substituted or unsubstituted hydrocarbyl or heterocyclic ring, wherein the ring has 5, 6, 7, or 8 ring atoms and where substitutions on the ring can join to form additional rings. Often, $R^{60}$ to $R^{66}$ are hydrogen. In any embodiment, $R^{62}$ may be joined with $R^{63}$ to form a phenyl ring fused to the existing phenyl ring (e.g., a naphthyl group), and $R^{60}$, $R^{61}$, $R^{64}$, $R^{65}$, and $R^{66}$ are independently hydrogen or an alkyl group, preferably hydrogen. In any embodiment of the invention, each $R^{54}$ and $R^{55}$ may independently be hydrogen, an alkyl group or an aryl group or substituted aryl group; preferably one or both $R^{54}$ or $R^{55}$ is hydrogen, or one $R^{54}$ or $R^{55}$ is hydrogen and the other is an aryl group or substituted aryl group. Preferred but non limiting aryl groups for $R^{54}$ or $R^{55}$ include phenyl, 2-methylphenyl, 2-ethylphenyl, 2-isopropylphenyl, and naphthyl.

In any embodiment of the invention, $R^{52}$ and $R^{51}$ may independently be aryl or substituted aryl; preferably $R^{51}$ is a substituted phenyl group such as, but not limited to 2,6-diisopropylphenyl, 2,6-diethylphenyl, 2,6-dimethylphenyl, mesityl, and the like, and preferably $R^{52}$ is phenyl or a substituted phenyl group such as, but not limited to 2-tolyl, 2-ethylphenyl, 2-propylphenyl, 2-trifluoromethylphenyl, 2-fluorophenyl, mesityl, 2,6-diisopropylphenyl, 2,6-diethylphenyl, 2,6-dimethylphenyl, 3,5-di-tert-butylphenyl, and the like.

Yet alternatively, suitable catalyst compounds that are chelated transition metal complexes (type 3), may be characterized as pyridyl diamide metal complexes, such as those having the following structural formula (XIb):

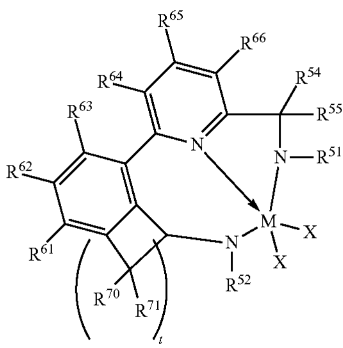

wherein M, X, N, $R^{51}$, $R^{52}$, $R^{54}$, $R^{55}$, $R^{61}$—$R^{66}$ are as previously defined as in formula (6) and (6a); each $R^{70}$—$R^{71}$ are independently selected from the group consisting of hydrogen, hydrocarbyls, substituted hydrocarbyls, alkoxy, aryloxy, halogen, amino, and silyl, and wherein any one or more adjacent $R^{70}$—$R^{71}$ may be joined to form a substituted or unsubstituted hydrocarbyl or heterocyclic ring, wherein the ring has 5, 6, 7, or 8 ring atoms and where substitutions on the ring can join to form additional rings, and t is 2 or 3 (corresponding to cyclopentyl and cyclohexyl rings, respectively).

Often, $R^{61}$—$R^{66}$ are hydrogen. In any embodiment of the invention, each $R^{70}$ and $R^{71}$ may independently be hydrogen, and t is 2 or 3, preferably 2. In any embodiment of the invention, each $R^{54}$ and $R^{55}$ may independently be hydrogen, an alkyl group or an aryl group or substituted aryl group; preferably one or both $R^{54}$ or $R^{55}$ is hydrogen, or one $R^{54}$ or $R^{55}$ is hydrogen and the other is an aryl group or substituted aryl group. Preferred but non limiting aryl groups include phenyl and 2-methylphenyl, 2-ethylphenyl, 2-isopropylphenyl and naphthyl. In any embodiment of the invention, $R^{52}$ and $R^{51}$ may independently be aryl or substituted aryl; preferably $R^{51}$ is a substituted phenyl group such as, but not limited to 2,6-diisopropylphenyl, 2,6-diethylphenyl, 2,6-dimethylphenyl, mesityl, and the like, and preferably $R^{52}$ is phenyl or a substituted phenyl group such as, but not limited to 2-tolyl, 2-ethylphenyl, 2-propylphenyl, 2-trifluoromethylphenyl, 2-fluorophenyl, mesityl, 2,6-diisopropylphenyl, 2,6-diethylphenyl, 2,6-dimethylphenyl, 3,5-di-tert-butylphenyl, and the like. Often, $R^{54}$, $R^{55}$, $R^{61}$—$R^{66}$, each $R^{70}$—$R^{71}$ are hydrogen, $R^{52}$ is phenyl, $R^{51}$ is 2,6-diisopropylphenyl and t is 2.

Non-limiting examples of pyridyl diamide catalysts that are chelated transition metal complexes (type 3) are illustrated below, wherein X is methyl, benzyl, or chloro:

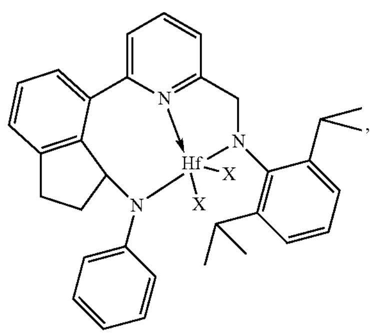

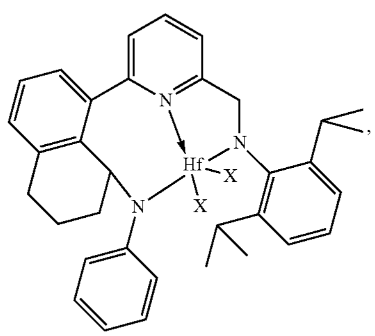

-continued

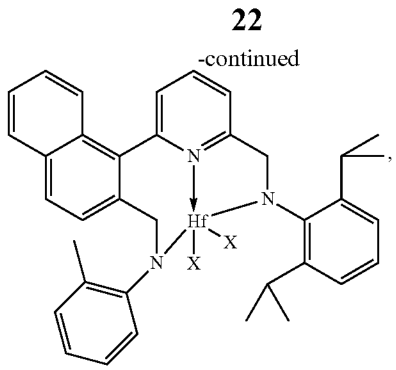

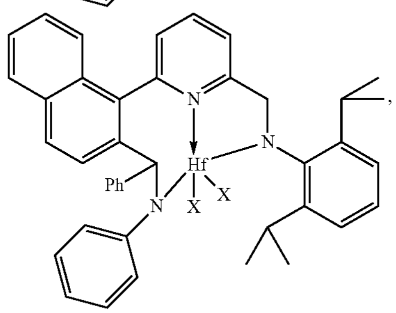

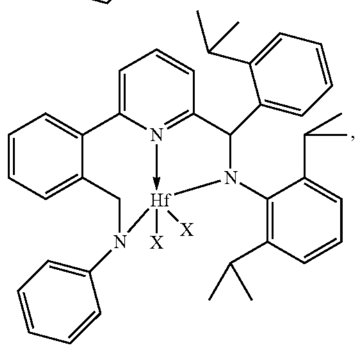

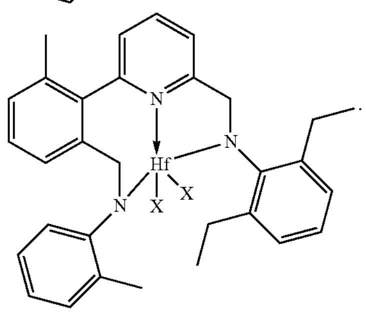

Additional particularly useful chelated transition metal complexes (type 3) including pyridyl diamide transition metal complexes are described in US 2014/0316089; WO 2012/134614; WO 2012/134615; WO 2012/134613; US 2012/0071616; US 2011/0301310; and US 2010/0022726 and are incorporated by reference.

Specific examples of bridged and unbridged metallocenes include, but are not limited to, $(1,3\text{-MeBuCp})_2ZrMe_2$, $Cp(Indenyl)ZrMe_2$, $(Me_4Cp)(nPrCp)ZrMe_2$, rac-dimethylsilylbis[(2-methyl-4-phenyl)indenyl] zirconiumdimethyl, rac-dimethylsilylbis[(2-methyl)indenyl]zirconiumdimethyl, rac-dimethylsilyl-bis(indenyl)hafniumdimethyl, rac-dimethylsilyl-bis(indenyl)hafniumdichloride, rac-dimethylsilyl-bis(2-methyl-4-phenyl-indenyl) hafniumdimethyl, rac-dimethylsilyl-bis(2-methyl-4-phenyl-indenyl) hafniumdichloride, rac-dimethylsilyl-bis(2-methyl-benzindenyl)hafniumdimethyl, rac-dimethylsilyl-bis(2- methyl-benzindenyl) hafniumdichloride, rac-dimethylsilyl-bis-(2-methyl-indenyl) hafniumdimethyl, rac-dimethylsilyl-bis-(2-methyl-indenyl) hafniumdichloride, rac-dimethylsilyl-bis(2-methyl-4-naphthyl-indenyl) hafniumdimethyl, rac-dimethylsilyl-bis(2-methyl-4-naphthyl-indenyl) hafniumdichloride, rac-ethylene-bis (indenyl)hafniumdimethyl, rac-ethylene-bis(indenyl) hafniumdichloride, rac-dimethylsilyl-bis(2-methyl-4-(2'-methyl-phenyl)-indenyl)hafniumdimethyl, rac-dimethylsilyl-bis(2-methyl-4-(2'-methyl-phenyl)-indenyl) hafniumdichloride, rac-dimethylsilyl-bis(2-methyl-4-(4'-methyl-phenyl)-indenyl)hafniumdimethyl, rac-dimethylsilyl-bis(2-methyl-4-(4'-methyl-phenyl)-indenyl) hafniumdichloride, rac-dimethylsilyl-bis(2-methyl-4-(4'-tert-butyl-phenyl)-indenyl)hafniumdimethyl, rac-dimethylsilyl-bis(2-methyl-4-(4'-tert-butyl-phenyl)-indenyl)hafniumdichloride, rac-dimethylsilyl-bis(2-methyl-4-(4'-tert-butyl-phenyl)-indenyl)hafniumdimethyl, rac-dimethylsilyl-bis(2-methyl-4-(4'-tert-butyl-phenyl)-indenyl)hafniumdichloride, rac-dimethylsilyl-(2-methyl-4-(4'-tert-butyl-phenyl)-indenyl)(2-isopropyl-4-(4'-tert-butyl-phenyl)-indenyl)hafniumdimethyl, rac-dimethylsilyl-(2-methyl-4-(4'-tert-butyl-phenyl)-indenyl)(2-isopropyl-4-(4'-tert-butyl-phenyl)-indenyl)hafniumdichloride, rac-dimethylsilyl-bis(2-methyl-4,6-diisopropyl-indenyl) hafniumdimethyl, rac-dimethylsilyl-bis(2-methyl-4,6-diisopropyl-indenyl)hafniumdichloride, and any zirconium analogs of the above.

Further suitable metallocene compounds include: bis(cyclopentadienyl)zirconiumdichloride, bis(cyclopentadienyl) zirconiumdimethyl, bis(pentamethylcyclopentadienyl)zirconiumdichloride, bis(pentamethylcyclopentadienyl) zirconiumdimethyl, bis(cyclopentadieneyl) (pentamethylcyclopentadienyl)zirconiumdichloride, bis (cyclopentadienyl)(pentamethylcyclopentadienyl) zirconiumdimethyl, bis(1-methyl,4-butylcyclopentadienyl) zirconiumdichloride, bis(1-methyl,4-butylcyclopentadienyl) zirconiumdimethyl, bis(1-methyl,4-butylcyclopentadienyl) zirconiumdimethoxide, bis(1-methyl,4-butylcyclopentadienyl)zirconiumdibenzyl, bis(1-methyl,4-butylcyclopentadienyl)zirconiumdifluoride, bis(1-methyl,4-butylcyclopentadienyl)zirconiumdiamide, bis(1-methyl,4-ethylcyclopentadienyl)zirconiumdichloride, bis(1-methyl,4-ethylcyclopentadienyl)zirconiumdimethyl, bis(1-methyl,4-benzylcyclopentadienyl)zirconiumdichloride, bis(1-methyl, 4-benzylcyclopentadienyl)zirconiumdimethyl, bis(1-methyl,3-butylcyclopentadienyl)zirconiumdichloride, bis(1-methyl,3-butylcyclopentadienyl)zirconiumdimethyl, bis(1-methyl,3-n-propylcyclopentadienyl)zirconiumdichloride, bis(1-methyl,3-n-propylcyclopentadienyl)zirconiumdimethyl, bis(1-methyl,3-iso-propylcyclopentadienyl)zirconiumdichloride, bis(1-methyl,3-iso-propylcyclopentadienyl) zirconiumdimethyl, bis(1,3-dimethylcyclopentadienyl) zirconiumdichloride, bis(1,3-dimethylcyclopentadienyl) zirconiumdimethyl, bis(n-propylcyclopentadienyl) zirconiumdichloride, bis(n-propylcyclopentadienyl) zirconiumdimethyl, bis(n-propylcyclopentadienyl) zirconiumdifluoride, bis(n-propylcyclopentadienyl) zirconiumdiamide, bis(n-propylcyclopentadienyl) zirconiumdibenzyl, bis(n-propylcyclopentadienyl) zirconiumdimethoxide, bis(n-propylcyclopentadienyl) hafniumdichloride, bis(n-propylcyclopentadienyl) hafniumdimethyl, bis(n-propylcyclopentadienyl) hafniumdifluoride, bis(n-propylcyclopentadienyl) hafniumdiamide, bis(n-propylcyclopentadienyl) hafniumdibenzyl, bis(n-propylcyclopentadienyl) hafniumdimethoxide, bis(n-butylcyclopentadienyl) zirconiumdichloride, bis(n-butylcyclopentadienyl)zirconiumdimethyl, bis(tert-butylcyclopentadienyl) zirconiumdichloride, bis(tert-butylcyclopentadienyl) zirconiumdimethyl, bis(benzylcyclopentadienyl) zirconiumdichloride, bis(benzylcyclopentadienyl) zirconiumdimethyl, bis(benzylcyclopentadienyl) (pentamethylcyclopentadienyl)zirconiumdimethyl, bis (benzylcyclopentadienyl)(pentamethylcyclopentadienyl) zirconiumdichloride, bis(propylcyclopentadienyl) (pentamethylcyclopentadienyl)zirconiumdimethyl, bis (propylcyclopentadienyl)(pentamethylcyclopentadienyl) zirconiumdichloride, bis(propylcyclopentadienyl) (tetramethylcyclopentadienyl)zirconiumdimethyl, bis (propylcyclopentadienyl)(tetramethylcyclopentadienyl) zirconiumdichloride, bis(tetramethyl, propylcyclopentadienyl)(pentamethylcyclopentadienyl) zirconiumdimethyl, bis(tetramethyl, propylcyclopentadienyl)(pentamethylcyclopentadienyl) zirconiumdichloride, bis(tetramethyl, propylcyclopentadienyl)(cyclopentadienyl) zirconiumdimethyl, bis(tetramethyl, propylcyclopentadienyl)(cyclopentadienyl) zirconiumdichloride, dimethylsilylbis(cyclopentadienyl) zirconiumdichloride, dimethylsilylbis(cyclopentadienyl) zirconiumdimethyl, dimethylsilylbis(cyclopentadienyl) zirconiumdimethoxide, dimethylsilylbis(cyclopentadienyl) zirconiumdiamide, dimethylsilylbis(cyclopentadienyl) zirconiumdifluoride, dimethylsilylbis(cyclopentadienyl) zirconiumdiiodide, dimethylsilylbis(cyclopentadienyl) zirconiumdibromide, dimethylsilylbis (pentamethylcyclopentadienyl)zirconiumdichloride, dimethylsilylbis(pentamethylcyclopentadienyl)zirconiumdimethyl, dimethylsilylbis(pentamethylcyclopentadienyl) zirconiumdifluoride, dimethylsilylbis(pentamethylcyclopentadienyl)zirconiumdimethoxide, dimethylsilylbis (pentamethylcyclopentadienyl)zirconiumdiamide, dimethylsilylbis(pentamethylcyclopentadienyl)zirconiumdibromide, dimethylsilylbis(pentamethylcyclopentadienyl) zirconiumdibnzyl, dimethylsilylbis(cyclopentadienyl)(pentamethylcyclopentadienyl)zirconiumdichloride, dimethylsilylbis(cyclopentadienyl)(pentamethylcyclopentadienyl)zirconiumdimethyl, dimethylsilylbis(cyclopentadienyl)(pentamethylcyclopentadienyl)zirconiumdimethoxide, dimethylsilylbis(cyclopentadienyl)(pentamethylcyclopentadienyl)zirconiumdibromide, dimethylsilylbis(cyclopentadienyl)(pentamethylcyclopentadienyl)zirconiumdiamide, dimethylsilylbis(cyclopentadienyl)(pentamethylcyclopentadienyl)zirconiumdifluoride, dimethylsilylbis(cyclopentadienyl)(pentamethylcyclopentadienyl)zirconiumdibnzyl, dimethylsilylbis(methylbutylcyclopentadienyl) zirconiumdichloride, dimethylsilylbis (methylbutylcyclopentadienyl)zirconiumdimethyl, dimethylsilylbis(methylbutylcyclopentadienyl)zirconiumdimethoxide, dimethylsilylbis(methylbutylcyclopentadienyl) zirconiumdibromide, dimethylsilylbis(methylbutylcyclopentadienyl)zirconiumdifluoride, dimethylsilylbis (methylbutylcyclopentadienyl)zirconiumdiamide, dimethylsilylbis(methylbutylcyclopentadienyl)zirconiumdimethoxide, dimethylsilylbis(methylbutylcyclopentadienyl) zirconiumdibenzyl, dimethylsilylbis(methylethylcyclopentadienyl)zirconiumdichloride, dimethylsilylbis (methylethylcyclopentadienyl)zirconiumdimethyl, dimethylsilylbis(methylbenzylcyclopentadienyl)zirconiumdichloride, dimethylsilylbis(methylbenzylcyclopentadienyl) zirconiumdimethyl, dimethylsilylbis(methylbutylcyclopentadienyl)zirconiumdichloride, dimethylsilylbis (methylbutylcyclopentadienyl)zirconiumdimethyl, dimethylsilylbis(n-propylmethylcyclopentadienyl)zirconiumdichloride, dimethylsilylbis(n-propylmethylcyclopentadienyl)zirconiumdimethyl, dimethylsilylbis(iso-propylmethylcyclopentadienyl)zirconiumdichloride, dimethylsilylbis(iso-propylmethylcyclopentadienyl)zirconiumdimethyl, dimethylsilylbis(dimethylcyclopentadienyl) zirconiumdichloride, dimethylsilylbis(dimethylcyclopentadienyl)zirconiumdimethyl, dimethylsilylbis(n-propylcyclopentadienyl)zirconiumdichloride, dimethylsilylbis(n-propylcyclopentadienyl)zirconiumdimethyl, dimethylsilylbis(n-butylcyclopentadienyl)zirconiumdichloride, dimethylsilylbis(n-butylcyclopentadienyl)zirconiumdimethyl, dimethylsilylbis(tert-butylcyclopentadienyl) zirconiumdichloride, dimethylsilylbis(tert-butylcyclopentadienyl)zirconiumdimethyl, dimethylsilylbis (benzylcyclopentadienyl)zirconiumdichloride, dimethylsilylbis(benzylcyclopentadienyl)zirconiumdimethyl, dimethylsilylbis(benzylcyclopentadienyl)(pentamethylcyclopentadienyl)zirconiumdimethyl, dimethylsilylbis (benzylcyclopentadienyl)(pentamethylcyclopentadienyl) zirconiumdichloride, dimethylsilylbis (propylcyclopentadienyl)(pentamethylcyclopentadienyl) zirconiumdimethyl, dimethylsilylbis (propylcyclopentadienyl)(pentamethylcyclopentadienyl) zirconiumdichloride, dimethylsilylbis (propylcyclopentadienyl)(tetramethylcyclopentadienyl) zirconiumdimethyl, dimethylsilylbis (propylcyclopentadienyl)(tetramethylcyclopentadienyl) zirconiumdichloride, dimethylsilylbis(tetramethyl, propylcyclopentadienyl)(pentamethylcyclopentadienyl) zirconiumdimethyl, dimethylsilylbis(tetramethyl, propylcyclopentadienyl)(pentamethylcyclopentadienyl) zirconiumdichloride, dimethylsilylbis(tetramethyl, propylcyclopentadienyl)(cyclopentadienyl) zirconiumdimethyl, and dimethylsilylbis(tetramethyl, propylcyclopentadienyl)(cyclopentadienyl) zirconiumdichloride. U.S. Pat. Nos. 6,180,736; 7,179,876; 8,957,171; and 9,045,568 also provide suitable unbridged metallocenes that are useful herein.

Co-activators

The organoaluminum activator described above can be combined with a second activator, also known as a co-activator. Non-limiting co-activators, for example, include alumoxanes, aluminum alkyls, ionizing activators, which may be neutral or ionic, and conventional-type cocatalysts. Particular co-activators include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

Alumoxane activators may be utilized as a co-activator in the catalyst composition. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). In one aspect, an alkylalumoxane is not required in the catalyst system.

When the co-activator is an alumoxane (modified or unmodified), the maximum amount of co-activator is generally a 5000-fold molar excess Al/M over the catalyst compound (per metal catalytic site). The minimum alumoxane-to-catalyst-compound is a 1:1 molar ratio. Other ranges may include from 1:1 to 1000:1, such as 1:1 to 500:1. For instance, alumoxane may be employed at any one of about 500, 450, 400, 350, 300, 250, 200, 150, 100, 50, 25, and 1 mole(s) or less, per mole catalyst compound. Alternatively, little or no alumoxane is used in the polymerization processes described herein. In particular, alumoxane may be present at zero mole %.

In addition or instead, catalyst systems of this invention can include at least one non-coordinating anion (NCA) co-activator. Non-coordinating anions useful in accordance with this invention are those that are compatible, stabilize the transition metal cation in the sense of balancing its ionic charge at +1, and yet retain sufficient ability to permit displacement during polymerization.

Preferred boron containing NCA activators are represented by the formula below:

$$Z_d^+(A^{d-})$$

where: Z is (L-H) or a reducible Lewis acid; L is a neutral Lewis base; H is hydrogen; (L-H) is a Bronsted acid; $A^{d-}$ is a boron containing non-coordinating anion having the charge d−; d is 1, 2, or 3. The cation component, $Z_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. Often, $Z_d^+$ is triphenyl carbonium. Preferred reducible Lewis acids can be any triaryl carbonium (where the aryl can be substituted or unsubstituted, such as those represented by the formula: ($Ar_3C^+$), where Ar is aryl or aryl substituted with a heteroatom, a $C_1$ to $C_{40}$ hydrocarbyl, or a substituted $C_1$ to $C_{40}$ hydrocarbyl), preferably the reducible Lewis acids in formula (14) above as "Z" include those represented by the formula: ($Ph_3C$), where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenylcarbonium.

When $Z_d^+$ is the activating cation $(L\text{-}H)_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference. Illustrative, but not limiting examples of boron compounds which may be used as an activating cocatalyst are the compounds described as (and particularly those specifically listed as) activators in U.S. Pat. No. 8,658,556, which is incorporated by reference herein.

Most preferably, the ionic stoichiometric activator $Z_d^+$ $(A^{d-})$ is one or more of: N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

For a list of particularly useful NCA co-activators please see U.S. Pat. No. 8,658,556, which is incorporated by reference herein. Particular examples of suitable NCA co-activators include: N,N-dimethylananlium tetrakis(pentafluorophenyl)borate; N,N-dimethylanalium tetrakis(perfluoronaphthyl)borate; N,N-dimethylanalium tetrakis(perfluorobiphenyl)borate; N,N-dimethylanalium tetrakis(3,5-bis(trifluoromethyl)phenyl)borate; triphenylcarbenium tetrakis(perfluoronaphthyl)borate; triphenylcarbenium tetrakis(perfluorobiphenyl)borate; triphenylcarbenium tetrakis(3,5-bis(trifluoromethyl)phenyl)borate; triphenylcarbenium tetrakis(perfluorophenyl)borate; $[Ph_3C^+][B(C_6F_5)_4^-]$; $[Me_3NH^+][B(C_6F_5)_4^-]$; 1-(4-(tris(pentafluorophenyl)borate)-2,3,5,6-tetrafluorophenyl)pyrrolidinium; tetrakis(pentafluorophenyl)borate; 4-(tris(pentafluorophenyl)borate)-2,3,5,6-tetrafluoropyridine; bis($C_4$-$C_{20}$alkyl) methylammonium tetrakis(pentafluorophenyl)borate; and bis(hydrogenated tallowalkyl)methylammonium tetrakis(pentafluorophenyl)borate.

Alternatively, one or more of the NCAs is chosen from the activators described in U.S. Pat. No. 6,211,105. Any of the NCAs described herein may optionally be mixed together before or after combination with the catalyst compound, preferably before being mixed with one or more catalyst compounds.

Further, the typical NCA-to-catalyst ratio for each of the catalysts (e.g., all NCA-to-catalyst or all NCAs-to-catalysts ratio) is a 1:1 molar ratio. Alternate preferred ranges include from 0.1:1 to 100:1. For instance, NCA-to-catalyst ratio may be any one of about 0.5, 1, 2, 5, 10, 50, 75, 100, 200, 250, 300, 350, 400, 450, 500, 600, 700, 800, 900, and 1000 to 1. Often, the NCA-to-catalyst ratio may be within a range between any two of the foregoing. It is also within the scope of this invention that either or both of the mono-Cp amido group 4 complexes, bridged fluorenyl-cyclopentadienyl group 4 complexes, biphenyl phenol (BPP) transition metal complexes, pyridyl amide transition metal complexes and/or pyridyl diamide transition metal complexes and other catalyst compounds can be combined with combinations of alumoxanes and NCAs.

Often, the activator(s) is/are contacted with a catalyst compound to form the catalyst system comprising activated catalyst and activator or other charge-balancing moiety, before the catalyst system is contacted with one or more monomers. Alternatively, the activator(s) may be co-fed to catalyst compound(s) together with one or more monomers. Where two or more catalyst systems are utilized in one polymerization zone (e.g., in a process using a multiple catalyst system as described in more detail below, such as a dual catalyst system), each of the catalyst compounds may be contacted with their respective activator(s) (which, again, may be the same or different) before being mixed together. Where the same activator is used for each, a mixture of catalyst mays be contacted with activator (either before or along with feeding of monomers to the catalyst mixture).

Solid Support Materials

This invention relates to catalyst systems comprising alkyl aluminum treated layered silicate supports. The layered silicate may be an ion exchanged layered silicate.

Preferred ion-exchange layered silicate useful in the present invention are silicate compounds having crystal structures wherein layers formed by strong ionic and covalent bonds are laminated in parallel with weak ionic bonding, and the ions contained between the layers are exchangeable. Most ion-exchange layered silicates naturally occur as the main component of clay minerals, but these ion-exchange layered silicates may be artificially synthesized materials. Preferred ion-exchange layered silicates useful in this invention include natural or synthetic montmorillonite, nontronite, beidellite, volkonskoite, laponite, hectorite, saponite, sauconite, stevensite, vermiculite, halloysite, aluminate oxides, bentonite, kaolinite, dickite, smectic clays, mica, magadiite, kenyaite, octosilicate, kanemite, makatite, attapulgite, sepiolite, zeolitic layered materials (such as ITQ-2, MCM-22, and ferrierite precursors) and mixtures thereof. Preferably, the ion-exchange layered silicate is acidified by contacting with an acid (such as sulfuric acid, hydrochloric acid, a carboxylic acid, an amino acid, or the like.)

Preferred ion-exchange layered silicates useful in this invention include those having a 1:1 type structure or a 2:1 type structure. Examples of the ion-exchange layered silicate include layered silicates having a 1:1 type structure or a 2:1 type structure as described in "Clay Mineralogy," written by R. E. Grim (published by McGraw Hill in 1968) and "Chemistry of Clays and Clay Minerals," written by A. C. Newman (published by John Wiley and Sons: New York in 1987). The 1:1 type structure is a structure formed by laminating 1:1 layered structures having one layer of tetrahedral sheet and one layer of octahedral sheet combined as described in the above literature "Clay Mineralogy," and the 2:1 type structure is a structure formed by laminating 2:1 layered structures having one layer of octahedral sheet sandwiched between two layers of tetrahedral sheets. Examples of ion exchange layered silicate comprising the 1:1 layer as the main constituting layer include kaolin group silicates such as dickite, nacrite, kaolinite, metahalloysite, halloysite or the like, and serpentine group silicates such as chrysotile, lizardite, antigorite or the like. Examples of ion-exchange layered silicate comprising the 2:1 layer as the main constituting layer include smectite group silicates such as montmorillonite, beidellite, nontronite, saponite, hectorite, stephensite or the like, vermiculite group silicates such as vermiculite or the like, mica group silicates such as mica, illite, sericite, glauconite or the like, and attapulgite, sepiolite, palygorskite, bentonite, pyrophyllite, talc, chlorites and the like. Mixed layer silicates are also included. Often, an ion-exchange layered silicate having the 2:1 type structure is preferable. Preferably, a smectite group silicate is used and in a particularly preferable example the ion exchange layered silicate comprises montmorillonite.

Kinds of exchangeable cations (a cation contained between layers of an ion-exchange layered silicate) are not specially limited, but the cations are preferably a metal of Group 1 of the Periodic Table of the Elements such as sodium or potassium, a metal of Group 2 of the Periodic Table of the Elements such as calcium or magnesium, or a transition metal such as iron, cobalt, copper, nickel, zinc, ruthenium, rhodium, palladium, silver, iridium, platinum, or gold, which are relatively easily available as industrial starting materials.

Often, the ion-exchange layered silicate has an average particle size of from 0.02 to 200 microns, preferably from 0.25 to 100 microns, even more preferably 0.5 to 50 microns. Often, the ion exchange layered silicates have a bi-modal distribution, or even multi-modal distribution, of particle sizes. (Particle size, also referred to as "average particle size," "particle diameter," or "average particle diameter," is determined using a Mastersizer™ 3000 (range of 1 to 3500 μm) available from Malvern Instruments Ltd. Worcestershire, England.)

The ion exchange layered silicate may be used in a dry state and/or may be used also in a slurry state in liquid and is preferably used as a free flowing powder after spray drying. Also, the shape of the ion-exchange layered silicate is not specially limited, and the shape may be a naturally occurring shape, an artificially synthesized shape or a shape of an ion-exchange layered silicate obtained after subjected to pulverizing, granulating and classifying.

Often, the ion-exchange layered silicates are used in the absence of other support type compounds. Likewise, alternatively the ion exchange layered silicates are combined with other support type compound and used in this invention. For example, an ion-exchange layered silicate, such as montmorillonite, may be combined with silica then combined with the organoaluminum activator(s) described herein. Often, the ion-exchange layered silicate may be utilized as part of an agglomerate (as described in US 2003/0096698 and U.S. Pat. No. 6,559,090 and are herein fully incorporated by reference), with at least one inorganic oxide component selected from $Na_2SiO_3$, $SiO_2$, $Al_2O_3$, MgO, $AlPO_4$, $TiO_2$, $ZrO_2$, or $Cr_2O_3$. The agglomeration of the ion-exchange layered silicate and inorganic oxide components may be carried out in accordance with the methods well known to the art, in particular, by such methods as spray drying.

Processing of a shape of an ion-exchange layered silicate by granulating, pulverizing or classifying may be carried out before chemical treatment (that is, the ion-exchange layered silicate having a shape previously processed may be subjected to the chemical treatment), or an ion-exchange layered silicate may be subjected to processing of a shape after chemical treatment. Processing may occur before or after chemical treatment with an organoaluminum activator, an inorganic oxide and/or combination with a polymerization catalyst; however, a particularly preferred method comprises dispersing the inorganic oxide and the ion-exchange layered silicate in water, thereafter spray drying, then contacting the spray dried particles with an organoaluminum activator, and thereafter contacting with polymerization catalyst.

Examples of a granulation method used herein include a stirring granulation method, a spraying granulation method, a tumbling granulation method, a bricketing granulation method, a compacting granulation method, an extruding granulation method, a fluidized layer granulation method, an emulsifying granulation method, a suspending granulation method a press-molding granulation method, and the like, but the granulation method is not limited thereto. Preferable examples include a stirring granulation method, a spraying granulation method, a tumbling granulation method and a fluidizing granulation method, and particularly preferable examples include a stirring granulation method and a spraying granulation method.

When carrying out the spraying granulation method, examples of a dispersion medium used for a starting slurry include water or an organic solvent. Preferably, water is used as a dispersion medium. A concentration of the ion-exchange layered silicate in a starting material slurry for the spraying granulation method producing spherical particles is from 0.1 wt % to 70 wt %, preferably from 1 wt % to 50 wt %, more preferably from 5 wt % to 30 wt %, based upon the weight of the slurry. An entrance temperature of hot air used in the spraying granulation method producing sphere particles varies depending on a dispersion medium used, but it is typically 120 to 600° C., preferably 150 to 590° C. when water is used as a dispersion medium. Preferably the outlet temperature is from 80 to 260° C., preferably 100 to 200° C., preferably 120 to 180° C.

Also, in the granulation step, an organic material, an inorganic solvent, an inorganic salt, various binders and the like may be used. Examples of the binders include sugar, dextrose, corn syrup, gelatin, glue, carboxymethylcelluloses, polyvinyl alcohol, water-glass, magnesium chloride, aluminum sulfate, aluminum chloride, magnesium sulfate, alcohols, glycol, starch, casein, latex, polyethylene glycol, polyethylene oxide, tar, pitch, alumina sol, gum arabic, sodium alginate, and the like. Also, the pulverizing method is not specially limited, and it may be either dry type pulverization or wet type pulverization.

When agglomerates are formed by spray drying, the agglomerates can be characterized in that typically at least 80, preferably at least 90, and most preferably at least 95 volume % of that fraction of the support agglomerate particles smaller that the $D_{90}$ of the entire agglomerate particle size distribution possesses microspheroidal shape (i.e., morphology). Evaluation of the microspheroidal morphology is performed on that fraction of the particle size distribution of the support agglomerates which is smaller than the $D_{90}$ to avoid distortion of the results by a few large particle chunks which because of their large volume, would constitute a non-representative sample of the agglomerate volume. The term "spheroidal" as used herein means small particles of a generally rounded, but not necessarily spherical shape. This term is intended to distinguish from irregular jagged chunks and leaf or rod like configurations. "Spheroidal" is also intended to include polylobed configurations wherein the lobes are also generally rounded, although polylobed structures are uncommon when the agglomerate is made as described herein.

Spray drying conditions are typically controlled in order to impart the desired target properties described above to the agglomerate. The most influential spray drying conditions are the pH of the aqueous slurry to be spray dried, as well as its dry solids content. By "dry solids content" as used herein is meant the weight of solids in the slurry after such solids have been dried at 175° C. for 3 hours, and then at 955° C. for 1 hour. Thus, dry solids content is used to quantify the weight of solid ingredients which exist in the slurry and to avoid inclusion of adsorbed water in such weight.

Typically, the pH of the slurry will be controlled or adjusted to be from about 2 to about 10 (e.g., 3 to 9, preferably from about 7 to about 9, such as about 4, and the dry solids content will be controlled or adjusted to be typically from about 10 to 30, preferably from about 15 to about 25, and most preferably from about 18 to about 22 (e.g., 20) weight % based on the weight of the slurry and the dry weight of the gel. Control of the remaining variables in the spray drying process, such as the viscosity and temperature of the feed, surface tension of the feed, feed rate, the selection and operation of the atomizer (preferably an air atomizer is employed and optionally with the use of a pressure nozzle, the atomization energy applied, the manner in which air and spray are contacted, and the rate of drying, are well within the skill of the spray dry artisan once directed by the target properties sought to be imparted to the product produced by the spray drying. (See for example U.S. Pat. No. 4,131,452.)

Product separation from the drying air follows completion of the spray drying stage when the dried product remains suspended in the air. Any convenient collection method can be employed, such as removal from the base of the spray dryer by the use of separation equipment.

Chemical Treatment of Ion-exchange Layered Silicate

The chemical treatment of an ion-exchange layered silicate is carried out by bringing it in contact with an acid, a salt, an alkali, an oxidizing agent, a reducing agent, or a treating agent containing a compound intercalatable between layers of an ion-exchange layered silicate. The intercalation means to introduce other material between layers of a layered material, and the material to be introduced is called a guest. Among these treatments, acid treatment or salt treatment is particularly preferable. A common effect achieved by chemical treatment is to exchange an intercalation.

A common effect achieved by chemical treatment is to exchange an intercalation cation with other cations, and in addition to this effect, the following various effects can be achieved by various chemical treatments. For example, acid treatment removes impurities on the surface of silicate, and cations such as Al, Fe, Mg, or the like, in a crystal structure are eluted, thereby increasing the surface area. This treatment enhances the acid strength and acidity of the layered silicate.

Alkali treatment destroys a crystal structure of a clay mineral, and changes a structure of the clay mineral. Also, intercalation or salt treatment forms an ion composite, a molecule composite, an organic derivative or the like, and changes a surface area or a distance between layers. By using an ion-exchange reaction, an exchangeable intercalated cation between layers can be replaced by other large bulky ions, thereby producing a layered material having the distance between layers enlarged. Thus, the bulky ions have a function as a column supporting the layered structure, and are called pillars.

In any embodiment, one, two, three, or more kinds of members selected from the group consisting of acids, salts, alkalis, oxidizing agents, reducing agents, and compounds intercalatable between layers of an ion-exchange layered silicate may be combined and used as treating agents. Also, acids, salts, alkalis, oxidizing agents, reducing agents, and compounds intercalatable between layers of an ion-exchange layered silicate may be respectively used in a combination of two or more members. Among them, a combination of a salt treatment and an acid treatment is particularly preferable.

The above-mentioned various treating agents may be used as a treating agent solution by dissolving in an appropriate solvent, or it is possible to use a treating agent itself as a solvent. Examples of a usable solvent include water, alcohols, aliphatic hydrocarbons, aromatic hydrocarbons, esters, ethers, ketones, aldehydes, furans, amines, dimethylsulfoxide, dimethylformamide, carbon disulfide, nitrobenzene, pyridines, or their halides. A concentration of a treating agent in a treating agent solution is preferably from 0.1 to 100 wt %, more preferably from 5 to 50 wt %. If the treating agent concentration is within these ranges, a time required for treatment becomes shorter and an efficient production is possible.

Chemical Treatment Protocol

Acid Treatment

An acid treatment removes impurities on the surface or ion-exchanges a cation present between layers, and in addition to this function, the acid treatment elutes a part or whole of cations such as Al, Fe, Mg, or the like in a crystal structure. Examples of an acid used in acid treatment include hydrochloric acid, nitric acid, sulfuric acid, phosphoric acid, acetic acid, oxalic acid, and the like. Particularly, it is preferable to use an inorganic acid. Usually the acid is used in a form of an acid aqueous solution. The acid used in the treatment may be a mixture of at least two kinds of acids. Preferably, the acid used herein is sulfuric acid.

Particularly preferably, the acid treatment is carried out with an acid having a specific concentration. Any concentration of acid may be used, however higher acid concentrations (and higher temperatures) are more efficient. In particular, using an acid concentration of more than 5 wt % (based upon the weight of the acid, any liquid diluent or solvent and the ion exchange layered silicate present), preferably more than 10 wt %, preferably more than 15 wt % has been found to be effective. Preferably, the treatment is performed at temperatures of more than 50° C., preferably more than 70° C., more preferably at more than 90° C. Preferably, the treatment is allowed to react for 5 minutes to 10 hours, more preferably 30 minutes to 8 hours, more preferably 1 to 6 hours. Particularly preferably, the treatment occurs at 90° C. or more for 2 to 6 hours using an acid concentration of more than 15 wt %. Alternatively, the treatment occurs at 100° C. or more for 2 to 4 hours using an acid concentration of more than 15 wt %.

An acid used for the concentrated acid treatment may be the same as those used in an ordinary acid treatment, but is preferably sulfuric acid, nitric acid or hydrochloric acid, more preferably sulfuric acid.

Salt Treatment

Further, one may carry out a salt treatment. The salt treatment means a treatment carried out for the purpose of exchanging cations in an ion-exchange layered silicate. The treating conditions with a salt are not specifically limited, but it is preferable to carry out the salt treatment under conditions of a salt concentration of from 0.1 to 50 wt %, a treating temperature of from room temperature to a boiling point and a treating time of from 5 minutes to 24 hours in such a manner as to elute at least a part of materials constituting an ion-exchange layered silicate. Also, the salt may be used in an organic solvent such as toluene, n-heptane, ethanol or the like, or may be used in the absence of a solvent if it is liquid-like at the treating temperature, but it is preferably used as an aqueous solution. However, depending on the kind of a salt employed, the salt treatment achieves an effect similar to an acid treatment.

Preferably, one can ion exchange at least 40%, preferably at least 60% of ion exchangeable cations of Group 1 metals contained in an ion-exchange layered silicate with cations dissociated from the salts as described above. After carrying out the above chemical treatment, it is preferable to remove ions eluted from the treatment and an excess amount of a treating agent. For this operation, water or an organic solvent is generally used. After dehydrating, drying is carried out generally at a drying temperature of from 100 to 800° C., preferably from 150 to 600° C.

Drying of Chemically Treated Ion-Exchange Layered Silicate

These ion-exchange layered silicates can change their properties depending on a drying temperature employed even when their structures are not destroyed, and it is therefore preferable to change a drying temperature depending on their uses. The drying period is usually in a range of from 1 minute to 24 hours, preferably from 5 minutes to 6 hours, and a drying atmosphere is preferably dry air, dry nitrogen, dry argon, or carried out under reduced pressure. A drying method is not specifically limited, but various methods may be employed.

Pore Size/Distribution

The evaluation of the pore size distribution useful herein employs the desorption isotherm (by nitrogen adsorption-desorption method). The desorption isotherm is a curve obtained while reducing the relative pressure. The desorption isotherm shows a lower relative pressure to the same desorbed gas amount as compared with adsorption isotherm, and consequently shows a lower free energy state, and is generally considered to be closer to a state of real thermodynamic stability.

In any embodiment, an ion-exchange layered silicate with any pore size and or any pore size distribution may be used. Alternatively, included in this invention is the preferred pore size distributions of the ion-exchange layered silicate as described in US 2003/0027950 (which is fully incorporated here by reference). Where $D_m$ (from differential values of pore volumes) represents a pore size diameter showing a maximum peak intensity and is generally expressed as "most frequently appearing pore diameter," $D_{VM}$ represents a maximum peak intensity and $D_{m1/2}$ represents a pore size diameter on the smaller diameter side corresponding to a point, the peak intensity of which is ½ of the maximum peak intensity. A pore diameter $D_{m1/2}$ is present at least one respectively on both sides of $D_m$, i.e., on the larger diameter side of $D_m$ and on the smaller diameter side of $D_m$, but a value on the smaller diameter side is taken as the $D_{m1/2}$ value in the present invention. Also, if there are a plurality of $D_{m1/2}$ values on the smaller diameter side, the largest value is employed for calculation. Often, the $D_{m1/2}/D_m$ can range from 0.1 to 0.9. Alternatively, a $D_{m1/2}/D_m$ value is preferably at least 0.68, more preferably at least 0.70.

An ion-exchange layered silicate may have a predetermined pore size, but its pore size is sufficiently large to accept a metallocene complex, an activator, an organoaluminum compound, and a monomer. Accordingly, these compounds participating in the reaction easily enter into pores in respective stages of formation of a catalyst, activation, prepolymerization and polymerization, and complexes are highly dispersed in carriers, and consequently metallocene catalyst active sites are thought to be uniformly formed. Preferably, the ion exchange layered silicate has a pore size that is sufficiently large enough that the catalyst compound, the organoaluminum and activator compounds may freely enter and diffuse evenly within the particle. Preferred pore sizes include 40 Angstroms to 500 Angstroms, preferably 50 Angstroms to 300 Angstroms, more preferably 70 to 200 Angstroms.

Olefin Polymerization Catalyst System

In the present invention, an olefin polymerization catalyst system can be prepared by contacting the organoaluminum activator described herein with a catalyst compound (also called catalyst precursor compounds, pre-catalyst compounds or catalyst precursors). In any embodiment, a supported catalyst system may be prepared, generally, by the reaction of the organoaluminum activator with the addition of a catalyst compound (such as a metallocene compound), followed by addition of an ion-exchange layered silicate. Alternately, a supported catalyst system may be prepared, generally, by the reaction of the organoaluminum activator, an ion-exchange layered silicate, and then adding one or more catalyst compounds.

Preferably, the ion exchange layered silicate is combined with the organoaluminum activator and thereafter is combined with the catalyst compound. Contact between an ion-exchange layered silicate and an organoaluminum activator and/or catalyst compound can be carried out under an inert gas atmosphere such as nitrogen in a solvent of an inert hydrocarbon such as hexane, heptane, pentane, cyclohexane, benzene, toluene, xylene or the like, and the solvent may be used alone or in a mixture of two or more. An amount of an organoaluminum activator used is preferably from 0.01 to 1000 mmol, more preferably from 0.1 to 100 mmol, per 1 g of an ion-exchange layered silicate. A concentration of an ion-exchange layered silicate in a solvent is preferably from 0.001 to 100 g/mL, more preferably form 0.01 to 10 g/mL, and a concentration of an organoaluminum activator is preferably from 0.001 to 100 mmol/mL, more preferably from 0.01 to 10 mmol.

Contacting may be carried out by dispersing an ion-exchange layered silicate in a solvent and then bringing an organoaluminum activator in contact therewith. Alternatively, contacting may be carried out by adding an organoaluminum activator to a solvent and then dispersing an ion-exchange layered silicate therein. The contacting treatment is carried out generally at a temperature of from −50° C. to a boiling point of a solvent, preferably from 0° C. to a boiling point of a solvent. The contacting time is from 1 minute to 48 hours, preferably from 1 minute to 24 hours.

The order of contacting an organoaluminum activator with an ion-exchange layered silicate is not specially limited as far as the object of the present invention is achieved, but it is more effective to carry out the contacting treatment after chemical treatment of the silicate or preferably after drying carried out after the chemical treatment. Also, the order of contacting treatment step of an organoaluminum activator agent and an ion-exchange layered silicate and the granulation step of an ion-exchange layered silicate is not specially limited as far as the object of the present invention is achieved, but it is preferable to carry out the treatment with an organoaluminum activator agent after granulating the silicate. Further, it is possible to enhance the effect of the present invention by combining the above-mentioned respective treatments. Thus, after controlling a particle size distribution and a carrier particle strength by granulating an ion-exchange layered silicate, a carrier obtained through the following Step 1 and Step 2 (see below) is used as a catalyst component for olefin polymerization.

Step 1: after granulating an ion-exchange layered silicate, the silicate is treated with an acid having an acid concentration as described above.

Step 2: after carrying out step 1, the silicate is treated with an organoaluminum activator which is any organoaluminum activator from the discussion above.

A metallocene can be added with, prior to, or after the silicate is treated with an organoaluminum activator.

Polymerization Process and Olefin Monomers

The organoaluminum activators of the invention and catalyst systems utilizing the organoaluminum activators described above are suitable for use in any prepolymerization and/or polymerization process over a wide range of temperatures and pressures. The temperatures may be in the range of from −60° C. to about 280° C., preferably from 50° C. to about 200° C. Alternatively the polymerization temperature is above 0° C., above 50° C., above 80° C., above 100° C., above 150° C., or above 200° C. In any embodiment, the pressures employed may be in the range from 1 atmosphere to about 500 atmospheres or higher.

Polymerization processes include solution, gas phase, slurry phase, and a high pressure process or a combination thereof. Particularly preferred is a gas phase or slurry phase polymerization of one or more olefin(s) at least one of which is ethylene or propylene.

In any embodiment, the process of the invention may be directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

Alternatively, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process. Yet alternatively, ethylene or propylene is polymerized with at least two different comonomers, optionally one of which may be a diene, to form a terpolymer.

In any embodiment, the invention may be directed to polymerization process, particularly a gas phase or slurry phase process, for polymerizing propylene alone or with one or more other monomers including ethylene, and/or other olefins having from 3 to 12 carbon atoms. The catalyst system may be employed in liquid phase (solution, slurry, suspension, bulk phase, or combinations thereof), in high pressure liquid, or supercritical fluid, or gas phase processes. Each of these processes may be employed in single, parallel or series reactors. The liquid processes comprise contacting the ethylene and/or alpha-olefin and at least one vicinally disubstituted olefin monomer with the catalyst system described herein in a suitable diluent or solvent and allowing the monomers to react for a sufficient time to produce embodiments of the invention copolymers. One or more of the monomers used in the polymerization may be utilized as a solvent and/or diluent, generally in homogeneous polymerizations in the liquid monomer or monomers. Hydrocarbyl solvents are also suitable, both aliphatic and aromatic, including hexane and toluene. Bulk and slurry processes may typically be accomplished by contacting the catalysts with a slurry of liquid monomer, the catalyst system being supported. Gas phase processes may use the supported catalyst and may be conducted in any manner known to be suitable for producing ethylene homopolymers or copolymers via coordination polymerization. Illustrative examples may be found in U.S. Pat. Nos. 4,543,399; 4,588,790; 5,028,670; 5,382,638; 5,352,749; 5,436,304; 5,453,471; 5,463,999; and WO 95/07942. Each is incorporated by reference for purposes of U.S. patent practice.

Generally, the polymerization reaction temperature may vary from −50° C. to 250° C. The reaction temperature conditions may be from −20° C. to 220° C., or below 200° C. The pressure may vary from 1 mm Hg to 2500 bar, or from 0.1 bar to 1600 bar, or from 1.0 to 500 bar. Where lower molecular weight copolymers, e.g., $M_n \leq 10{,}000$, are sought, it may be suitable to conduct the reaction processes at temperatures above 0° C. and pressures under 500 bar.

Polymer Products

The polymers produced by the process of the invention can be used in a wide variety of products and end-use applications. The polymers produced can be homo- and copolymers of ethylene and propylene and include linear low density polyethylene, elastomers, plastomers, high-density polyethylenes, medium density polyethylenes, low density polyethylenes, polypropylene and polypropylene copolymers. Polymers, typically ethylene based copolymers, have a density of from 0.86 g/cc to 0.97 g/cc; density being measured in accordance with ASTM-D-1238. Propylene based polymers produced include isotactic polypropylene, atactic polypropylene and random, block or impact copolymers.

The polymers of the invention may have an $M_n$(number-average molecular weight) value from 300 to 1,000,000, or between from 700 to 300,000. For low weight molecular weight applications, such as those copolymers useful in lubricating and fuel oil compositions, an $M_n$ of 300 to 20,000 is contemplated, or less than or equal to 10,000. Additionally, copolymer of the invention will comprise a molecular weight distribution (Mw/Mn) in the range of ≥1, or ≥1.5 or ≤6, or ≤4 or ≤3, preferably from greater than 1 to 40, alternatively from 1.5 to 20, alternatively from 1.5 to 10, alternatively from 1.6 to 6, alternatively from 1.5 to 4, or alternatively from 2 to 3.

Preferred propylene polymer, preferably homopolymer, produced herein has an Mw of 20,000 up to 2,000,000 g/mol.

For higher molecular weight applications, preferred polymer, preferably homopolymer, produced herein has an Mw of 20,000 up to 2,000,000 g/mol, alternately 50,000 to 1,500,000 g/mol, alternately 100,000 to 1,300,000 g/mol, alternately 300,000 to 1,300,000 g/mol, alternately 500,000 to 1,300,000 g/mol.

Mn is number average molecular weight, Mw is weight average molecular weight, and Mz is z average molecular weight. Molecular weight distribution (MWD) is defined to be Mw divided by Mn. Unless otherwise noted, all molecular weight units (e.g., Mw, Mn, Mz) are g/mol.

The polymers of this invention may be blended and/or coextruded with any other polymer. Non-limiting examples of other polymers include linear low density polyethylenes, elastomers, plastomers, high pressure low density polyethylene, high density polyethylenes, isotactic polypropylene, ethylene propylene copolymers and the like.

EXAMPLES

Montmorillonite KSF was purchased from Sigma-Aldrich.

Tri-n-octyl aluminum (TnOAl) was purchased Akzo Nobel and used as received. (1,3-Me-nBuCp)$_2$ZrCl$_2$ was purchased from Albermarle. This catalyst precursor was converted to a dimethyl complex (Complex A) via reaction with methyl Grignard reagent.

Syntheses of Organoaluminum Activators

Synthesis of $\{[(CH_3)_2CHCH_2]_2AlCH_2CH_2\}_2Si(CH_3)_2$ (1)

Divinyldimethylsilane (1.81 g, 16.1 mmol) and diisobutylaluminum hydride (4.56 g, 32.3 mmol) were added together in a screw top flask without solvent to form a mixture. The mixture was heated to 75° C. and stirred at this temperature for a period of 4 hours form the title compound. The mixture was cooled to room temperature and transferred to a vial to obtain a colorless oil of 1 (5.47 g). The product formation was confirmed by $^1$H NMR spectroscopy. $^1$H NMR ($C_6D_6$): δ=0.104 (br, d, 7.56H), 0.293 (br, d, 8H), 1.035 (d, br)+1.084 (s, br) (combined 28.18H), 1.949 (septet, 4.23H).

Synthesis of $\{[(CH_3)_2CHCH_2]_2AlCH_2CH_2\}_4Si$ (2)

Tetravinylsilane (1.15 g, 8.43 mmol) was dissolved in 40 mls of toluene to form a solution. Diisobutylaluminum hydride (4.80 g, 33.7 mmol) was dissolved in 15 mls of toluene, and this solution was added to the tetravinylsilane solution. The resulting mixture was stirred at 50° C. for 2 hours and then stirred at 65° C. for 2 hours to form the title compound. The mixture was removed under the flow of dry nitrogen in vacuo, and then dried overnight at room temperature to obtain an oil of 2 (5.14 g). The product formation was confirmed by $^1$H NMR spectroscopy. $^1$H NMR ($C_6D_6$): δ=0.308 (br, 16H), 1.039 (d, br, 48H), 1.149 (s, br, 8H), 1.4 (br, 8H), 1.965 (septet, 8H).

Synthesis of Catalyst Compound (Complex B)

Synthesis of Dimethylsilylene(2,3,4,5-tetramethylcyclopentadienyl)(indenyl)zirconium dimethyl Lithium indenide (2.92 g, 23.9 mmol) was dissolved in 100 mls of THF. A THF solution of $Me_4CpSiMe_2Cl$ (5.14 g, 23.9 mmol) was added to the solution. The solution was allowed to stir overnight. The reaction was then blown down, taken up in pentane and filtered through celite. The filtrate was then dried under vacuum to give 6.78 g of oil that was immediately taken to the next step.

The above oil (6.78 g) was dissolved in diethyl ether and chilled to −35° C. $^n$BuLi (20.3 mL, 2.5M, 50.75 mmol) was added dropwise, and the solution was allowed to stir over the weekend. The solution was blown down and vacuum dried to remove the ether. The solid was washed with pentane and dried under vacuum to give 2.7859 g of solid with roughly 0.75 eq of ether still attached, 33.94% yield. $^1$H NMR (THF-$d_8$): δ=0.549 (s, br, 6H), 1.111 (t, 4.61H, ether) 1.895 (s, br, 6H) 2.103 (s, br, 6H), 3.381 (q, 3H, ether), 5.998 (m, 1H), 6.439 (m, br, 2H), 6.764 (d, 1H), 7.306 (d, br, 1H), 7.606 (d, br, 1H).

$ZrCl_4$ (1.8197 g, 7.8085 mmol) was slurried in 50 mls of dichloromethane. The deprotanated ligand was added as a solid and washed down with 10 mls of diethyl ether, and an additional 50 mls of dichloromethane was then added to the solution. The solution was stirred overnight. The mixture was filtered through celite, blown down, and dried under vacuum to give 2.7953 g of a yellow solid, dimethylsilylene (2,3,4,5-tetramethylcyclopentadienyl (indenyl)zirconium dichloride, 78.74% yield. $^1$H NMR ($CD_2Cl_2$): δ=0.940(s, 3H), 1.138(s, 3H), 1.865(d, 6H), 1.913(s, 3H) 1.925(s, 3H), 5.986(d, 1H), 7.030(m, 1H), 7.171(br, 1H), 7.303(d, 2H), 7.65(d, 1H).

The produced dimethylsilylene(2,3,4,5-tetramethylcyclopentadienyl)(indenyl)-zirconium dichloride (2.7659 g, 6.0840 mmol) was dissolved in 100 mls of dichloromethane. Methyl Grignard reagent (5 mls of 3.0M MeMgBr in ether, 15 mmol) was added to the solution via syringe. The solution was stirred overnight, then filtered through celite and the solvent was removed. The resulting product was dissolved in a toluene/pentane solution and again filtered through celite. Recrystallization from the toluene/pentane mixture gave 1.2776 g of material, 50.75% yield. $^1$H NMR ($C_6D_6$): δ=−1.341ppm (s, 3H), −0.182(s, 3H), 0.472(s, 3H), 0.643(s, 3H), 1.614(s, 3H), 1.700(s, 3H), 1.815(s, 3H), 1.832(s, 3H), 5.547(d, 1H), 6.881(t, 1H), 7.033(d, 1H), 7.175(d, 1H), 7.283(d, 1H), 7.6(d, 1H).

Support Syntheses

Spray Dried Montmorillonite, Support 1

Support 1 was prepared by adding 2500 g of montmorillonite (K-10, Sigma-Aldrich) to 3.4 liters of deionized water. A homogeneous slurry, with an agglomerate size $d_{50}$ typically in the range of 15 μm, was achieved by stirring with a high-shear mixer for 60 min. Then 27 g of sodium silicate (reagent grade, Aldrich) were added to the mixture and homogenized for 5 min; achieving a final solids content of 30 wt %. The obtained slurry was spray dried at a rate of 300 cc/min using a Bowen spray drier with an inlet temperature in the range of 716° F. and 1100° F. (380° C. and 593° C.), depending on feed flow, and a target outlet temperature of 320° F. (160° C.). The product was recovered as a dry, flowing powder with an agglomerate size $d_{50}$ between 90 and 150 μm, and moisture content between 17 and 6 wt %, depending on spray gas pressure. Finally, the support was dried further at 121° F. (250° C.) for 16 h.

$\{[(CH_3)_2CHCH_2]_2AlCH_2CH_2\}_2Si(CH_3)_2$ Treated Montmorillonite KSF, Support 2

$\{[(CH_3)_2CHCH_2]_2AlCH_2CH_2\}_2Si(CH_3)_2$ (0.918 g) was slurried in 15 mls of toluene and added to a Celstir™ flask. Support 1 (3.33 g) was added neat to the slurry followed by 5 mls of toluene. The slurry was stirred for an hour at 60° C. The slurry was then filtered, washed three times with 15 mls of toluene each, washed twice with pentane, and dried under vacuum to give 3.34 g of tan powder.

$\{[(CH_3)_2CHCH_2]_2AlCH_2CH_2\}_4Si$ Treated Montmorillonite KSF, Support 3

Support 1 (3.22580 g) was slurried in 25 mls of toluene. $\{[(CH_3)_2CHCH_2]_2AlCH_2CH_2\}_4Si$ (1.7447 g) was dissolved in 5 mls of toluene and added to the slurry. The slurry was stirred for an hour at 60° C. The slurry was then filtered, washed three times with 15 mls of toluene each, washed twice with pentane, and dried under vacuum to give 3.37 g of tan solid.

Supported Catalyst Syntheses

Supported Catalyst A1

Support 2 ($\{[(CH_3)_2CHCH_2]_2AlCH_2CH_2\}_2Si(CH_3)_2$ treated Montmorillionite) (1.01 g) was slurried in 10 mls of toluene. 15.7 mg of Complex A (0.0408 mmol), was dissolved in 5 mls of toluene and added to the slurry. The slurry was stirred for 1 h. The slurry was then filtered, washed three times with 15 mls of toluene each, washed twice with pentane, and dried under vacuum to give 0.975 g of reddish solid.

Supported Catalyst A2

Support 3 ($\{[(CH_3)_2CHCH_2]_2AlCH_2CH_2\}_4Si$ treated Montmorillionite) (1.20 g) was slurried in 15 mls of toluene. 18.5 mg of Complex A (0.0389 mmol), was dissolved in 5 mls of toluene and added to the slurry. The slurry was stirred for 1 h. The slurry was then filtered, washed three times with 15 mls of toluene each, and dried under vacuum to give 1.20 g of brown solid.

Supported Catalyst B

Support 1 (Montmorillonite) (0.317 g), 5.3 mg of Complex B, and 1.27 g of $\{[(CH_3)_2CHCH_2]_2AlCH_2CH_2\}_4Si$ were slurried in 15 mls of toluene and agitated for two hours to form a preslurry.

Ethylene-Hexene Copolymerization

A 2 liter autoclave reactor was baked out at 100° C. for at least 1 h. The reactor was cooled to room temperature. 2 mls of a 0.091M TnOAl solution in hexane was loaded into a catalyst tube as a scavenger and injected into the reactor with nitrogen gas. The nitrogen in the reactor was vented down until the pressure was just above ambient pressure. 300 mls of isohexane was added to the reactor. A second cat tube containing 1-hexene was then attached to the reactor. The 1-hexene was injected into the reactor with 300 mls of isohexane. The reactor was heated to 85° C. and the stir rate was set to 500 rpm. When the proper temperature had been reached 20 psi of ethylene was added to the reactor. A third cat tube containing the catalyst system (usually 55 to 65 mg) and 2 mls of pentane was then attached to the reactor. The catalyst system was pushed into the reactor with 200 mL of isohexane. A constant ethylene pressure, approximately 130 psi on top of the pressure of isohexane, approximately 190 psi total, was bubbled through the catalyst tube and the reactor's dip tube. The reactor stirred for 30 min before being vented and cooled down. The polymer was collected in a beaker and placed under air purge to evaporate the isohexane and collect the dry polymer.

Products were characterized as follows:

$^1$H NMR $^1$H NMR spectroscopic studies were performed using a Bruker 400 or 500 MHz NMR. Data was collected using samples prepared by dissolving 10-20 mg the compound in 1 mL of the specified solvent, such as $C_6D_6$. Samples were then loaded into 5 mm NMR tubes for data collection. The chemical shifts (δ) presented are relative to the residual protium in the deuterated solvent at 7.15 ppm.

Gel Permeation Chromatography with Three Detectors (GPC-3D)

Mw, Mn and Mw/Mn are determined by using a High Temperature Gel Permeation Chromatography (Agilent PL-220), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001) and references therein. Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c=K_{DRI}I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm$^3$, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, Light Scattering from Polymer Solutions, Academic Press, 1971):

$$\frac{K_o c}{\Delta R(\theta)} = \frac{1}{MP(\theta)} + 2A_2 c.$$

Here, ΔR(θ) is the measured excess Rayleigh scattering intensity at scattering angle θ, c is the polymer concentration determined from the DRI analysis, $A_2$ is the second virial coefficient. P(θ) is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, which take the same value as the one obtained from DRI method. The refractive index, n=1.500 for TCB at 145° C. and λ=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s=c[\eta]+0.3(c[\eta])^2$$

where c is concentration and was determined from the DRI output.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules,* 2001 volume 34(19), pages 6812-6820).

All molecular weights are weight average unless otherwise noted. All molecular weights are reported in g/mol unless otherwise noted.

Hexene wt % is estimated by $^1$H NMR.

Melt Index (MI, also referred to as I2) is measured according to ASTM D1238 at 190° C., under a load of 2.16 kg unless otherwise noted. The units for MI are g/10 min or dg/min.

High Load Melt Index (HLMI, also referred to as 121) is the melt flow rate measured according to ASTM D-1238 at 190° C., under a load of 21.6 kg. The units for HLMI are g/10 min or dg/min.

Melt Index Ratio (MIR) is the ratio of the high load melt index to the melt index, or I21/I2.

TABLE 1

| Supported Catalyst | Catalyst | Support | Hexene Loading (mls) | PE Yield (grams) | Act (gPE/ gscat*hr) | MI (dg/min) | MIR | Mw (kg/mol) | Mn (kg/mol) | Mw/Mn |
|---|---|---|---|---|---|---|---|---|---|---|
| A1 | A | 2 | 10 | 26.6 | 805 | 0.234 | 17.1 | 198 | 91 | 2.17 |
| A1 | A | 2 | 20 | 33.7 | 1033 | 0.242 | 18.6 | 163 | 72 | 2.26 |
| A1 | A | 2 | 20 | 33.3 | 1022 | 0.218 | 17.1 | 182 | 89 | 2.05 |
| A2 | A | 3 | 10 | 22.8 | 818 | 0.185 | 15.8 | 203 | 87 | 2.33 |
| B | B | 1 | 10 | 42.9 | 429 | 4.96 | 19.1 | n/a | n/a | n/a |

All documents described herein are incorporated by reference herein for purposes of all jurisdictions where such practice is allowed, including any priority documents, related applications, and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise, whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A catalyst system comprising an ion-exchange layered silicate, a catalyst compound, and an organoaluminum activator represented by the formula:

$$(R^1{}_2\text{—Al—}R^3)_q\text{—X—}R^*{}_y$$

wherein each $R^1$, independently, is a $C_1$-$C_{40}$ alkyl group;

each $R^3$, independently, is a $C_2$-$C_{20}$ hydrocarbon;

each R*, independently, is a hydrogen atom or a $C_1$-$C_{40}$ alkyl group;

X is carbon or silicon;

y is 0, 1, 2, or 3;

q is 1, 2, 3, or 4;

wherein q+y=4; and wherein q is 2, 3, or 4 if X is carbon.

2. The catalyst system of claim 1, wherein one or more $R^3$ hydrocarbons is represented by the formula:

$$\text{—}(CH_2)_n\text{—}$$

where n is an integer from 2 to 20.

3. The catalyst system of claim 1, wherein one or more $R^1$ groups is methyl, ethyl, propyl, isobutyl, butyl, hexyl, or octyl.

4. The catalyst system of claim 1, wherein q=2.

5. The catalyst system of claim 1, wherein q=4.

6. The catalyst system of claim 1, wherein the ion-exchanged layered silicate is selected from the group consisting of montmorillonite, nontronite, beidellite, volkonskoite, laponite, hectorite, saponite, sauconite, stevensite, vermiculite, halloysite, aluminate oxides, bentonite, kaolinite, dickite, smectic clays, mica, magadiite, kenyaite, octosilicate, kanemite, makatite, attapulgite, sepiolite, zeolitic layered materials, and mixtures thereof.

7. The catalyst system of claim 1, wherein the ion-exchanged layered silicate is selected from the group consisting of dickite, nacrite, kaolinite, metahalloysite, halloysite, chrysotile, lizardite, antigorite, montmorillonite, beidellite, nontronite, saponite, hectorite, stephensite, vermiculite, mica, illite, sericite, glauconite, attapulgite, sepiolite, palygorskite, bentonite, pyrophyllite, talc, chlorites, and mixtures thereof.

8. The catalyst system of claim 1, wherein the ion-exchanged layered silicate comprises montomorillonite.

9. The catalyst system of claim 1, wherein a combination of the ion-exchanged layered silicate and an inorganic oxide is spray dried prior to contact with the organoaluminum activator.

10. The catalyst system of claim 1, wherein the catalyst compound is a metallocene catalyst.

11. The catalyst system of claim 10, wherein the catalyst compound is $Me_2Si$(2,3,4,5-tetramethylCp)(Ind)$ZrMe_2$.

12. A polymerization process comprising contacting one or more alkene monomers with the catalyst system of claim 1.

13. The process of claim 12, wherein the monomer comprises ethylene and/or propylene.

14. The process of claim 12, wherein the polymerization is conducted in gas phase or as a slurry.

15. A composition comprising the reaction product of (i) a trialkyl aluminum or a dialkyl aluminum hydride and (ii) an alkene terminated compound, wherein the alkene terminated compound has at least two alkene termini, and the alkene terminated compound is a multivinylsilane.

16. A composition comprising the reaction product of:

(i) an alkyl aluminum represented by the formula:

$$AlR_3$$

wherein each R is independently, a hydrogen atom or a substituted or unsubstituted alkyl group and/or a substituted or unsubstituted aryl group; and (ii) an alkene terminated compound represented by the formula:

$$X(R')_{4-v}(R^4)_v$$

wherein X is Si, $R^4$ is a hydrocarbenyl group containing 2 to 20 carbon atoms having an alkene terminus, R' is a hydrogen atom or a hydrocarbyl group containing 1 to 30 carbon atoms, v is 1, 2, 3, or 4.

17. The composition of claim 16, wherein the alkyl aluminum is diisobutyl aluminum hydride.

18. The composition of claim 16, wherein the alkene terminated compound has at least two alkene termini.

19. A composition comprising the reaction product of:

(i) an alkyl aluminum represented by the formula:

$AlR_3$ wherein each R is independently, a hydrogen atom or a substituted or unsubstituted alkyl group and/or a substituted or unsubstituted aryl group; and (ii) an alkene terminated compound represented by the formula:

$X(R')_{4-v}(R^4)_v$ wherein X is Si or C, $R^4$ is a hydrocarbenyl group containing 2 to 20 carbon atoms having an alkene terminus, R' is a hydrogen atom or a hydrocarbyl group containing 1 to 30 carbon atoms, v is 1, 2, 3, or 4 if X is Si, and v is 2, 3, or 4 if X is C wherein the alkene terminated compound has at least two alkene termini and the alkene terminated compound is a multivinylsilane.

20. The composition of claim 19, wherein the multivinylsilane is selected from the group consisting of tetravinylsilane, methyltrivinylsilane, dimethyldivinylsilane, diethyldivinylsilane, di-n-dodecyldivinylsilane, cyclohexyltrivinylsilane, phenyltrivinylsilane, methylphenyldivinylsilane, benzyltrivinylsilane, and (3-ethylcyclohexyl) (3-n-butylphenyl)divinylsilane.

21. A composition comprising the formula:

$(R^1{}_2—Al—R^3)_q—X—R^*{}_y$ wherein each $R^1$, independently, is a $C_1$-$C_{40}$ alkyl group;

each $R^3$, independently, is a $C_2$-$C_{20}$ hydrocarbon;

each R*, independently, is a hydrogen atom or a $C_1$-$C_{40}$ alkyl group;

X is silicon;

y is 0, 1, 2, or 3;

q is 1, 2, 3, or 4;

wherein q+y=4; and wherein q is 2, 3.

22. A supported activator comprising an ion-exchange layered silicate and the composition of claim 20.

23. The supported activator of claim 22, further comprising a metallocene catalyst.

24. The supported activator of claim 22, wherein non-coordinating anion is absent.

25. The supported activator of claim 22, wherein alumoxane is absent.

26. A polymerization process comprising contacting one or more alkene monomers with the catalyst system of claim 2, wherein one or more $R^1$ groups is methyl, ethyl, propyl, isobutyl, butyl, hexyl, or octyl.

27. The process of claim 26, wherein the monomer comprises ethylene and/or propylene.

28. The process of claim 26, wherein the polymerization is conducted in gas phase or as a slurry.

29. The polymerization process of claim 12, where q is 2 or 4.

30. The process of claim 29, wherein the monomer comprises ethylene and/or propylene.

31. The process of claim 29, wherein the polymerization is conducted in gas phase or as a slurry.

32. A polymerization process comprising contacting one or more alkene monomers with the catalyst system of claim 9.

33. The process of claim 32, wherein the monomer comprises ethylene and/or propylene.

34. The process of claim 32, wherein the polymerization is conducted in gas phase or as a slurry.

35. A polymerization process comprising contacting one or more alkene monomers with the catalyst system of claim 10.

36. The process of claim 35, wherein the monomer comprises ethylene and/or propylene.

37. The process of claim 35, wherein the polymerization is conducted in gas phase or as a slurry.

38. A polymerization process comprising contacting one or more alkene monomers with the catalyst system of claim 10, wherein the monomer comprises ethylene and/or propylene and the polymerization is conducted in gas phase or as a slurry.

39. A polymerization process comprising contacting one or more alkene monomers with the catalyst system of claim 11, wherein the monomer comprises ethylene and/or propylene and the polymerization is conducted in gas phase or as a slurry.

* * * * *